(12) United States Patent
Chae

(10) Patent No.: US 11,991,180 B2
(45) Date of Patent: May 21, 2024

(54) AUTHENTICATION SYSTEM, AUTHENTICATION DEVICE, AUTHENTICATION METHOD AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 398 days.

(21) Appl. No.: 17/418,264

(22) PCT Filed: Dec. 27, 2019

(86) PCT No.: PCT/JP2019/051568
§ 371 (c)(1),
(2) Date: Jun. 25, 2021

(87) PCT Pub. No.: WO2021/131059
PCT Pub. Date: Jul. 1, 2021

(65) Prior Publication Data
US 2022/0311774 A1    Sep. 29, 2022

(51) Int. Cl.
*H04L 9/40*    (2022.01)
(52) U.S. Cl.
CPC .......... *H04L 63/102* (2013.01); *H04L 63/083* (2013.01); *H04L 63/0861* (2013.01)
(58) Field of Classification Search
None
See application file for complete search history.

(56) References Cited

U.S. PATENT DOCUMENTS

| | | | | |
|---|---|---|---|---|
| 7,131,132 | B1 * | 10/2006 | Gehlot | H04H 60/33 |
| | | | | 713/168 |
| 8,955,147 | B2 * | 2/2015 | Lee | G06F 21/74 |
| | | | | 726/28 |

(Continued)

FOREIGN PATENT DOCUMENTS

| | | |
|---|---|---|
| EP | 2131321 A1 | 12/2009 |
| EP | 3786820 A1 | 3/2021 |

(Continued)

OTHER PUBLICATIONS

Search Report dated Nov. 11, 2021, for corresponding EP Patent Application No. 19956183.8 pp. 1-8.

(Continued)

*Primary Examiner* — James R Turchen
(74) *Attorney, Agent, or Firm* — HEA LAW PLLC

(57) ABSTRACT

An authentication system, including at least one processor configured to: perform, based on a similarity between input authentication information that has been input and registered authentication information that has been registered, authentication of a user to be authenticated; determine whether there is a possibility that the user is authenticated as another user; acquire, when it is determined that there is the possibility that the user is authenticated as another user, for the input authentication information, a plurality of pieces of processed authentication information processed differently from each other; and determine, when it is determined that there is the possibility that the user is authenticated as another user, whether a predetermined number or more of pieces of processed authentication information are more similar to the registered authentication information than to the input authentication information and perform the authentication based on a result of the determination.

17 Claims, 12 Drawing Sheets

(56) References Cited

U.S. PATENT DOCUMENTS

| | | | | |
|---|---|---|---|---|
| 9,472,067 | B1* | 10/2016 | Jentoft | G08B 15/02 |
| 2013/0021240 | A1* | 1/2013 | Coulon | G06F 21/6245 |
| | | | | 382/103 |
| 2013/0159217 | A1* | 6/2013 | Davis | H04L 63/10 |
| | | | | 705/400 |
| 2014/0330729 | A1* | 11/2014 | Colangelo | G06Q 20/4012 |
| | | | | 705/72 |
| 2016/0300049 | A1* | 10/2016 | Guedalia | G06V 30/1985 |
| 2018/0285629 | A1 | 10/2018 | Son et al. | |
| 2019/0089866 | A1* | 3/2019 | Horishita | H04N 1/00251 |
| 2020/0089851 | A1* | 3/2020 | Kumar Agrawal | H04L 9/3226 |
| 2020/0097704 | A1* | 3/2020 | Storm | G06V 40/172 |
| 2020/0349786 | A1* | 11/2020 | Ho | G06V 40/172 |
| 2021/0076212 | A1* | 3/2021 | Manikantan Shila | |
| | | | | H04W 12/065 |
| 2021/0406347 | A1* | 12/2021 | Kim | G06F 21/45 |

FOREIGN PATENT DOCUMENTS

| | | | |
|---|---|---|---|
| JP | H08263655 | A | 10/1996 |
| JP | 2003323618 | A | 11/2003 |
| JP | 2008071366 | A | 3/2008 |
| JP | 2012133565 | A | 7/2012 |
| JP | 2018165983 | A | 10/2018 |

OTHER PUBLICATIONS

International Search Report for PCT/JP2019/051568 (See the transmittal letter).
Office Action dated Mar. 2, 2021, for corresponding JP application No. 2020-564760 with partial English translation.

* cited by examiner

FIG.10

| USER ID | NAME | PASSWORD | FACE PHOTOGRAPH | FEATURE AMOUNT OF FACE | PASSCODE | REGISTRATION DATE AND TIME | TELEPHONE NUMBER | EMAIL ADDRESS |
|---|---|---|---|---|---|---|---|---|
| u00001 | A | ******* | aaa.jpg | (a1,a2,a3,·····) | 1427 | 2019/6/20 16:43:51 | 090-1234-5678 | aaa123@mailadd.com |
| u00002 | B | ****** | bbb.jpg | (b1,b2,b3,·····) | 1427 | 2019/3/12 11:20:05 | 080-1876-5234 | 987bbb@abcmail.jp |
| u00003 | C | ******** | ccc.jpg | (c1,c2,c3,·····) | 9128 | 2019/6/5 21:15:41 | 03-9999-1111 | ccc555ccc@xyzfirm.com |
| : | : | : | : | : | : | : | : | : |

DB

AUTHENTICATION SYSTEM, AUTHENTICATION DEVICE, AUTHENTICATION METHOD AND PROGRAM

CROSS REFERENCE TO RELATED APPLICATIONS

This application is a National Stage of International Application No. PCT/JP2019/051568 filed on Dec. 27, 2019. The contents of the above document is incorporated herein by reference in its entirety.

TECHNICAL FIELD

The present disclosure relates to an authentication system, an authentication device, an authentication method, and a program.

BACKGROUND ART

There has hitherto been known an authentication technology for preventing impersonation by a third party. For example, in Patent Literature 1, there is described a system in which face photographs having a plurality of patterns are registered in advance, and face authentication is executed by using a face photograph having a suitable pattern.

CITATION LIST

Patent Literature

[PTL 1] JP 2008-071366 A

SUMMARY OF INVENTION

Technical Problem

However, in the face authentication described in Patent Literature 1, a determination is performed based on similarity between face photographs having a plurality of patterns registered in advance and the face photograph photographed at the time of authentication. Therefore, when the face of a third party is similar, regardless of the pattern of the face photograph that is used, authentication may be successful. As a result, there are cases in which it is not possible to prevent impersonation by a third party, and security may not be sufficiently enhanced.

It is an object of the present disclosure to provide an authentication system, an authentication device, an authentication method, and a program, which are capable of sufficiently enhancing security.

Solution to Problem

According to one aspect of the present invention, there is provided an authentication system including: first authentication means for performing, based on input authentication information that has been input and registered authentication information that has been registered, authentication of a user to be authenticated; determination means for determining whether there is a possibility that the user is authenticated as another user; acquisition means for acquiring, when it is determined that there is the possibility that the user is authenticated as another user, processed authentication information obtained by processing at least one of the input authentication information or the registered authentication information; and second authentication means for performing, when it is determined that there is the possibility that the user is authenticated as another user, the authentication based on the processed authentication information.

According to one aspect of the present invention, there is provided an authentication device included in the authentication system described above or below, or an authentication device communicable to and from the authentication system described above or below, the authentication device including: transmission means for transmitting information required for the authentication; and processing execution means for executing predetermined processing when the authentication is successful.

According to one aspect of the present invention, there is provided an authentication method including: a first authentication step of performing, based on input authentication information that has been input and registered authentication information that has been registered, authentication of a user to be authenticated; a step of determining whether there is a possibility that the user is authenticated as another user; a step of acquiring, when it is determined that there is the possibility that the user is authenticated as another user, processed authentication information obtained by processing at least one of the input authentication information or the registered authentication information; and a second authentication step of performing, when it is determined that there is the possibility that the user is authenticated as another user, the authentication based on the processed authentication information.

According to one aspect of the present invention, there is provided a program for causing a computer to function as: first authentication means for performing, based on input authentication information that has been input and registered authentication information that has been registered, authentication of a user to be authenticated; determination means for determining whether there is a possibility that the user is authenticated as another user; acquisition means for acquiring, when it is determined that there is the possibility that the user is authenticated as another user, processed authentication information obtained by processing at least one of the input authentication information or the registered authentication information; and second authentication means for performing, when it is determined that there is the possibility that the user is authenticated as another user, the authentication based on the processed authentication information.

According to one aspect of the present invention, the first authentication means is configured to perform the authentication based on a similarity between the input authentication information and the registered authentication information, the processed authentication information is information obtained by processing the input authentication information, and the second authentication means is configured to determine whether the processed authentication information is more similar to the registered authentication information than to the input authentication information, and to perform the authentication based on a result of the determination.

According to one aspect of the present invention, the acquisition means is configured to acquire, for the input authentication information, a plurality of pieces of processed authentication information processed differently from each other, and the second authentication means is configured to determine whether a predetermined number or more of pieces of processed authentication information are more similar to the registered authentication information than to the input authentication information, and to perform the authentication based on a result of the determination.

According to one aspect of the present invention, the predetermined number is a total number of the plurality of pieces of processed authentication information, and the second authentication means is configured to determine whether all of the plurality of pieces of processed authentication information are more similar to the registered authentication information than to the input authentication information, and to perform the authentication based on a result of the determination.

According to one aspect of the present invention, the first authentication means is configured to perform the authentication based on a similarity between the input authentication information and the registered authentication information, and the determination means is configured to determine that there is the possibility that the user is authenticated as another user when a plurality of pieces of registered authentication information are similar to the input authentication information.

According to one aspect of the present invention, the determination means is configured to acquire a similarity degree between the input authentication information and each of the plurality of pieces of registered authentication information, and to determine whether there is the possibility that the user is authenticated as another user based on a difference between the acquired similarity degrees.

According to one aspect of the present invention, the first authentication means is configured to perform the authentication based on a similarity between the input authentication information and the registered authentication information, and the determination means is configured to acquire a similarity degree of the registered authentication information determined to be similar to the input authentication information and a similarity degree of the registered authentication information determined not to be similar to the input authentication information, and to determine whether there is the possibility that the user is authenticated as another user based on a difference between the acquired similarity degrees.

According to one aspect of the present invention, the first authentication means is configured to perform, as the authentication, a first authentication to be performed based on a similarity between first input authentication information and first registered authentication information, and a second authentication to be performed based on a match between second input authentication information and second registered authentication information, and the determination means is configured to determine, in both the first authentication and the second authentication, whether there is the possibility that the user is authenticated as another user.

According to one aspect of the present invention, the first authentication means is configured to acquire a similarity degree between the input authentication information and the registered authentication information based on a learning model, and to perform the authentication based on the similarity degree, and the second authentication means is configured to acquire a similarity degree corresponding to the processed authentication information based on the learning model, and to perform the authentication based on the similarity degree.

According to one aspect of the present invention, the input authentication information is an input image that has been input or an input feature amount corresponding to the input image, the registered authentication information is a registered image that has been registered or a registered feature amount corresponding to the registered image, and the processed authentication information is a processed image obtained by processing at least one of the input image or the registered image, or a processed feature amount corresponding to the processed image.

According to one aspect of the present invention, the authentication is biometric authentication, the input authentication information is biometric authentication information that has been input, the registered authentication information is biometric authentication information that has been registered, and the processed authentication information is biometric authentication information that has been processed.

According to one aspect of the present invention, the acquisition means is configured to acquire, when there is the possibility that the user is authenticated as another user, the processed authentication information by processing the input authentication information.

According to one aspect of the present invention, the processed authentication information is information obtained by processing the registered authentication information before it is determined whether there is the possibility that the user is authenticated as another user, and the acquisition means is configured to acquire, when it is determined that there is the possibility that the user is authenticated as another user, the processed authentication information processed in advance.

According to one aspect of the present invention, the authentication system further includes processing execution means for executing, when the authentication is successful, payment processing based on payment information on a user for which the authentication is successful.

Advantageous Effects of Invention

According to the present disclosure, it is possible to enhance the security sufficiently.

BRIEF DESCRIPTION OF DRAWINGS

FIG. 10 is a table for showing a data storage example of a user database.

DESCRIPTION OF EMBODIMENTS

1. Overall Configuration of Authentication System

Figure 1:
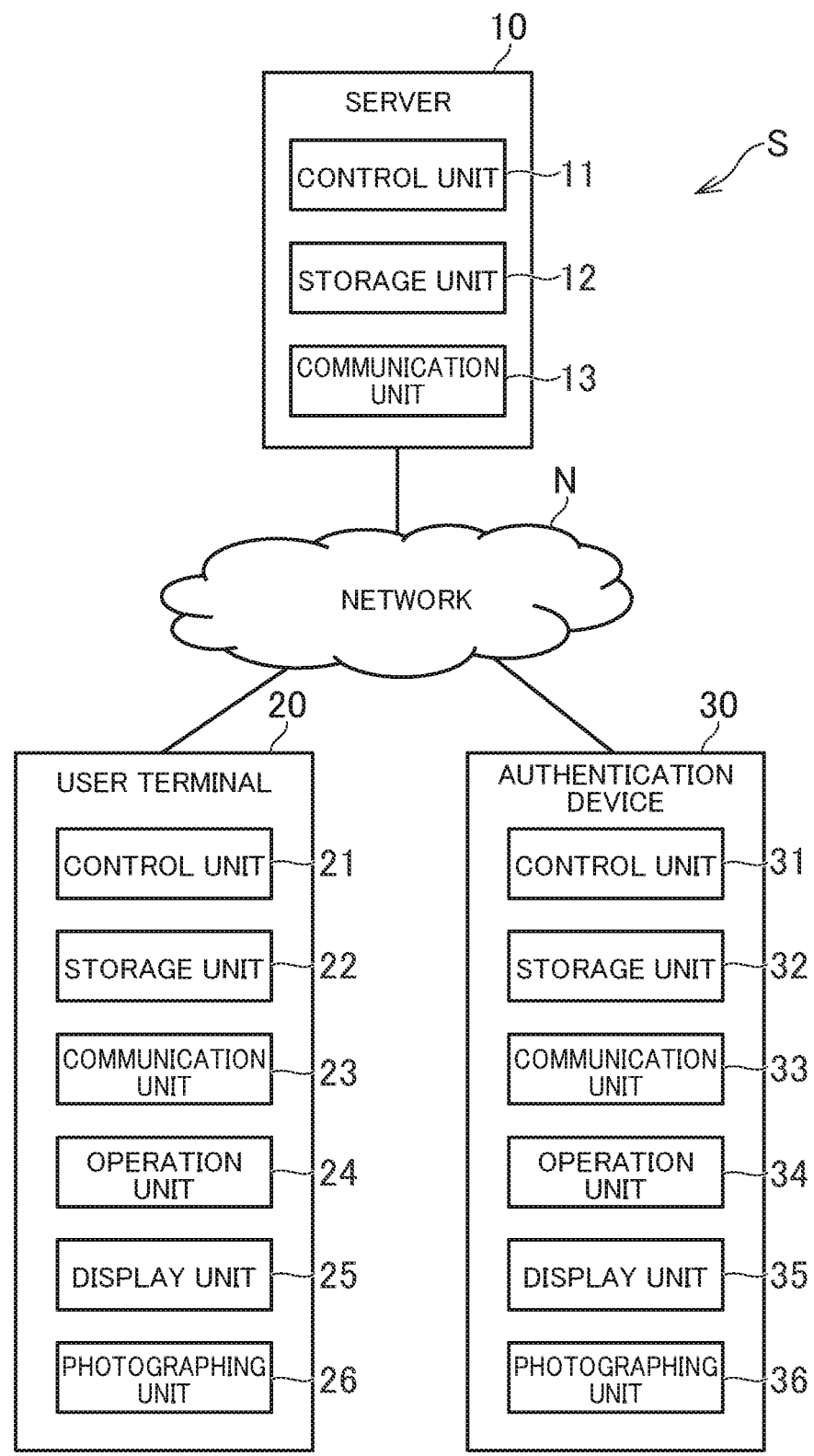
FIG. 1 is a diagram for illustrating an overall configuration of an authentication system.

There is now described an example of an embodiment of the present invention. FIG. 1 is a diagram for illustrating an overall configuration of the authentication system. As illustrated in FIG. 1, an authentication system S includes a server 10, a user terminal 20, and an authentication device 30, each of which can be connected to a network N, for example, the Internet. In FIG. 1, there is illustrated one server 10, one user terminal 20, and one authentication device 30, but there may be a plurality of each of those.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. For example, the user terminal 20 is a cell phone (including smartphones), a portable information terminal (including tablet computers and wearable terminals), or a personal computer. In this embodiment, the user terminal 20 includes a control unit 21, a storage unit 22, a communication unit 23, an operation unit 24, a display unit 25, and a photographing unit 26. The physical configuration of each of the control unit 21, the storage unit 22, and the communication unit 23 may be the same as those of the control unit 11, the storage unit 12, and the communication unit 13, respectively.

The operation unit 24 is an input device, and is, for example, a pointing device such as a touch panel and a mouse, a keyboard, or a button. The operation unit 24 transmits details of operation to the control unit 21. The display unit 25 is, for example, a liquid crystal display unit or an organic EL display unit. The display unit 25 displays an image in accordance with an instruction of the control unit 21.

The photographing unit 26 includes at least one camera. For example, the photographing unit 26 includes an image pickup element such as a CCD image sensor or a CMOS image sensor, and records an image picked up by the image pickup element as digital data. The image may be a still image or a moving image picked up continuously at a predetermined frame rate.

The authentication device 30 is a computer to be used for authentication. For example, the authentication device 30 is a cell phone, a portable information terminal, or a personal computer. In this embodiment, the authentication device 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, the display unit 35, and the photographing unit 36 may be the same as those of the control unit 11, the storage unit 12, the communication unit 13, the operation unit 24, the display unit 25, and the photographing unit 26, respectively.

Programs and data to be described as being stored into the storage units 12, 22, and 32 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

2. Outline of Authentication System

The authentication system S is configured to execute authentication in order to confirm the validity of the user in a suitable situation. The authentication is an action of confirming whether or not the user has a predetermined qualification, and may be referred to as "other-party authentication" or "personal authentication." The authentication system S can execute various types of authentication. For example, the authentication system S can execute biometric authentication, passcode authentication, password authentication, electronic stamp authentication, or countersign authentication.

Biometric authentication is an authentication method that uses a physical feature or behavioral characteristic of a human. Examples of biometric authentication that uses a physical feature includes face authentication, fingerprint authentication, DNA authentication, palm authentication, retina authentication, iris authentication, vein authentication, and voice authentication. Examples of biometric authentication that uses a behavioral feature include handwriting authentication, key stroke authentication, lip movement authentication, eye blinking authentication, and gait authentication.

In this embodiment, processing of the authentication system S is described by using a situation in which the user passes through a security gate as an example. The authentication system S is applicable to various situations, as described in modification examples of the present invention later, and the situations to which the authentication system S is applied are not limited to the example of this embodiment.

Figure 2:
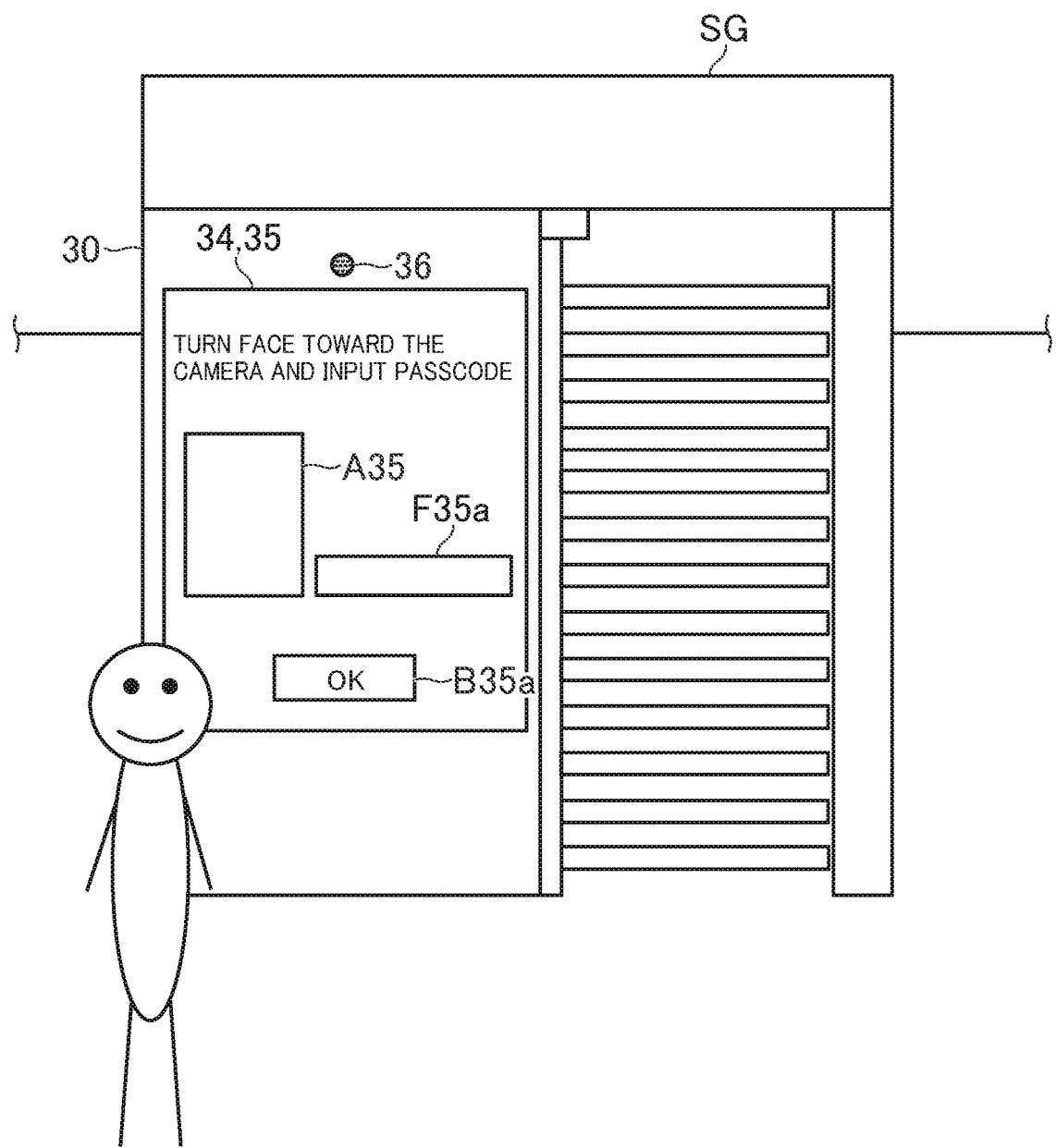
FIG. 2 is a diagram for illustrating an example of a situation in which the authentication system is used.

FIG. 2 is a diagram for illustrating an example of a situation in which the authentication system S is used. As illustrated in FIG. 2, a security gate SG includes a rotatable door, and is connected to the authentication device 30. The door of the security gate SG is locked by a lock mechanism, and is unlocked when user authentication is successful. When the lock is unlocked, the user can push the door to pass through the door. The door is locked again when the door is rotated by a predetermined angle. The door may be an opening and closing type of door, and the opening and closing may be controlled by an electronic lock.

For example, the security gate SG may be arranged at any facility, such as at a company for which the user works or at a public facility, and only those who are qualified to enter are allowed to pass through the security gate SG. In this embodiment, two-step authentication, which is a combination of the biometric authentication and the passcode authentication, is used to enhance security. Moreover, in place of the two-step authentication, authentication employing only one step may be performed, or authentication employing three or more steps may be performed.

In this embodiment, the user performs predetermined use registration when using the authentication service provided by the authentication system S. In place of the user performing the use registration himself or herself, the use registration may be performed based on an operation by, for example, an operator in response to an application by the user for the use registration on a document. For example, a new user who has not yet performed the use registration operates the user terminal 20 to upload a face photograph and a desired passcode together with his or her name and other such information to the authentication service provided by the authentication system S. When those pieces of information have been uploaded, the use registration is complete, and the user can use the authentication service.

Figure 3:
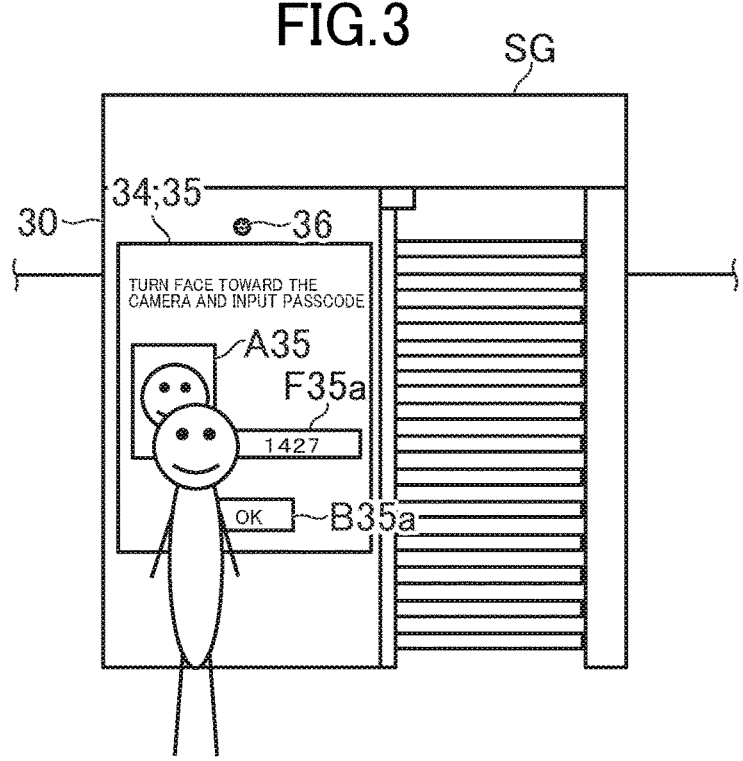
FIG. 3 is a diagram for illustrating how a user passes through a security gate.
Figure 3:
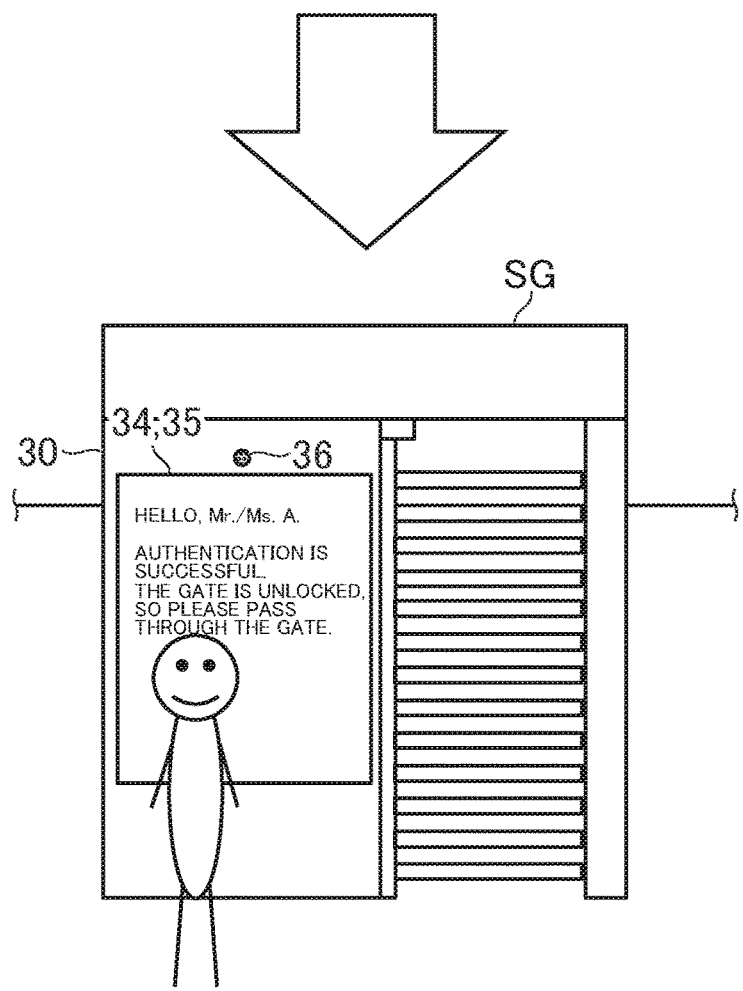

FIG. 3 is a diagram for illustrating how a user passes through the security gate SG. As illustrated in FIG. 3, the user causes the photographing unit 36 to photograph his or her face in accordance with guidance displayed on the display unit 35 of the authentication device 30. For example, an image photographed by the photographing unit 36 is displayed in a display area A35 of the display unit 35. The user operates the operation unit 34 to input his or her passcode into an input form F35a displayed on the display unit 35.

When the user selects a button B35a, the image photographed by the photographing unit 36 and the passcode input to the input form F35a are transmitted to the server 10, and face authentication and passcode authentication are executed. As illustrated in FIG. 3, when those two authentications are successful, the security gate SG is unlocked, and the user can pass through the security gate SG.

Even when the above-mentioned two-step authentication is employed, there may be a case in which the user in front of the security gate SG and another user having a similar face are using the same passcode as each other. In this case, there is a possibility that the user in front of the security gate SG is authenticated as the another user, and passes through the security gate SG by impersonating the another user.

Figure 4:
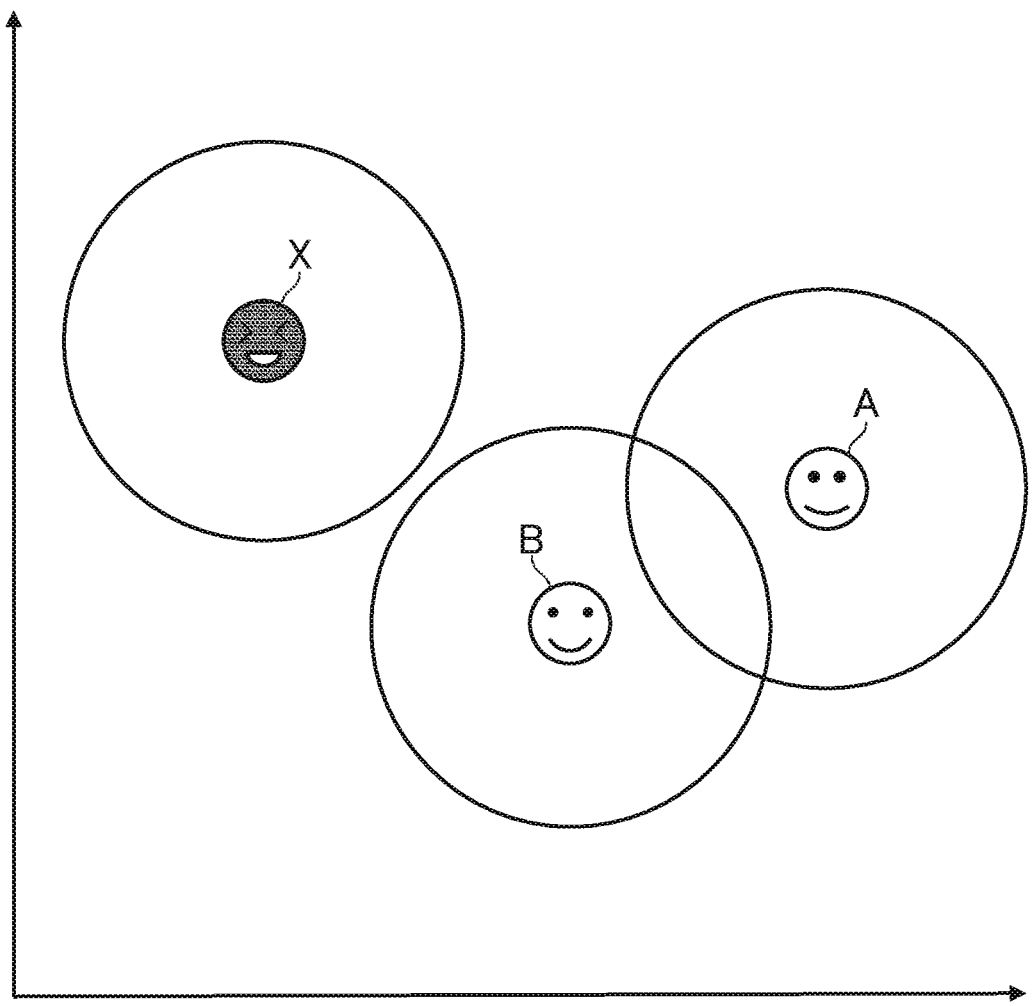
FIG. 4 is a diagram for illustrating an example of face photographs registered by users using the same passcode as each other.

FIG. 4 is a diagram for illustrating an example of face photographs registered by users using the same passcode as each other. In FIG. 4, there is illustrated a case in which a feature amount of the face photograph registered by each of users A, B, and X is represented by an m-dimensional vector (m is a natural number). In practice, the feature amount of the face is represented by a vector of several tens to several thousands of dimensions. However, in FIG. 4, in order to simplify the description, there is described a case in which the value of m is 2 and the feature amount of the face is represented by two-dimensional coordinates. In this case, it is assumed that the users A, B, and X have registered the same passcode of "1427".

On coordinates as shown in FIG. 4, the difference in the feature amount of the face is represented as a distance. As the distance becomes closer, the feature amount of the face becomes more similar, and as the distance becomes more distant, the feature amount of the face becomes less similar. In the example of FIG. 4, the users A and B have similar faces to each other, and therefore the feature amount of the face of the user A and the feature amount of the face of the user B are close in the vector space. The face of the user X is not similar to those of the users A and B, and therefore the feature amount of the face of the user X and the feature amount of the face of each of the users A and B are distant from each other in the vector space.

In this embodiment, passcode authentication is first executed. After that, face authentication is executed based on the feature amount of the face photograph serving as the query at the time of authentication and the feature amount of the face photograph registered by the user having a matching passcode. The face photograph serving as the query is the face photograph photographed by the photographing unit 36. That is, the face photograph serving as the query is a face photograph obtained by photographing the user who is in front of the security gate SG.

For example, face authentication is executed by determining whether or not the distance between the feature amount of the face photograph serving as the query and the feature amount of the face photograph registered by the user having a matching passcode is less than a predetermined threshold value Th. The threshold value Th is a threshold value serving as a reference regarding whether or not a face is similar. In FIG. 4, a range of the threshold value Th is indicated by a circle. When the feature amount of the face photograph serving as the query is included in the circle, this means that the face photograph is similar to the face of the user corresponding to this circle. In this case, the threshold value Th is common to all users, but a different threshold value Th may be set for each user.

The distance in the vector space between the feature amounts of users having similar faces is short, and therefore the circle ranges of those users may overlap. In the example of FIG. 4, the user A and the user B have similar faces to each other, and therefore a part of the circles of those users overlaps. For example, when the user A has come in front of the security gate SG and the feature amount of the face photograph of the user A is close to that of the user B due to factors, for example, how light is hitting the face, the feature amount of the face photograph serving as the query is included in both the circle of the user A and the circle of the user B.

Figure 5:
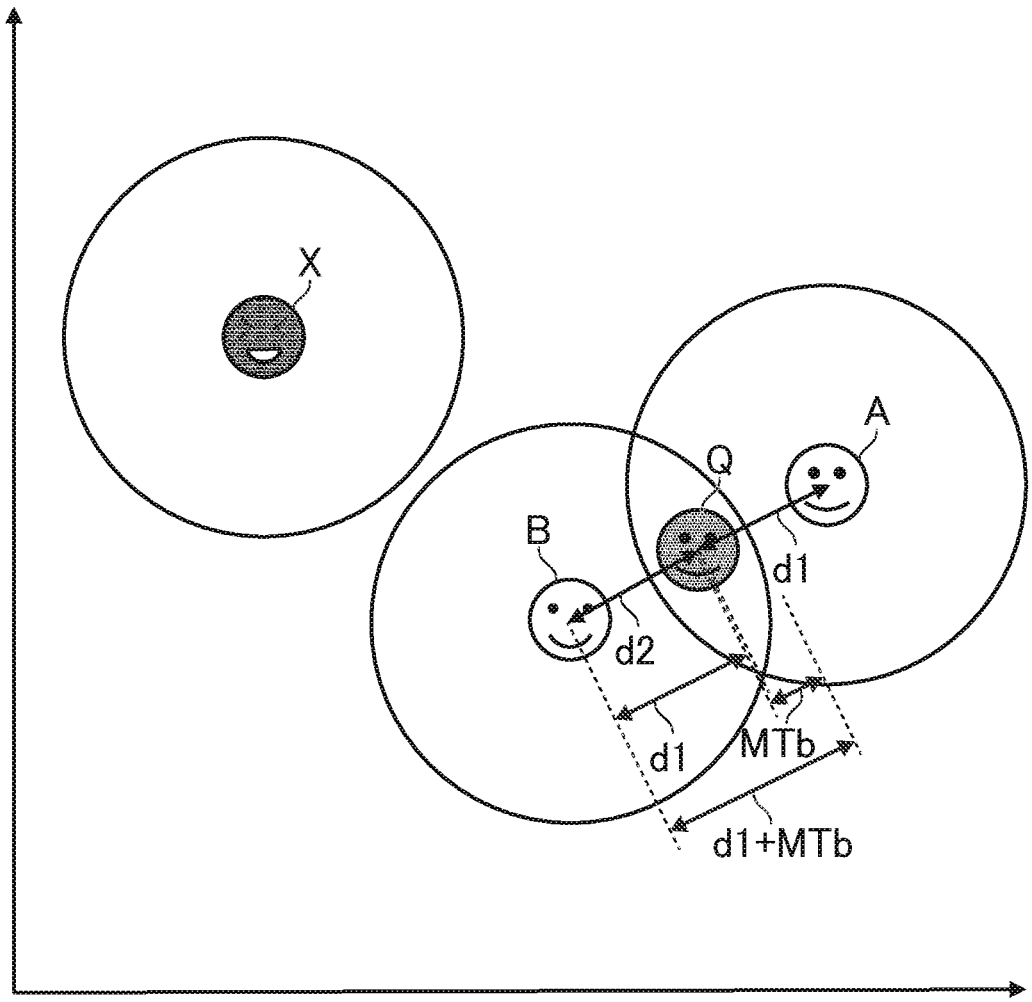
FIG. 5 is a diagram for illustrating a case in which a feature amount of a face photograph serving as a query is included in two circles.

FIG. 5 is a diagram for illustrating a case in which the feature amount of the face photograph serving as the query is included in two circles. As illustrated in FIG. 5, even when the user A has come in front of the security gate SG, the feature amount of the face photograph serving as a query Q may be included in both the circle of the user A and the circle of the user B. For example, when the feature amount closest to the feature amount of the face photograph serving as the query Q is the feature amount of the face photograph of the user A, a distance d1 between those feature amounts may be less than the threshold value Th, but a distance d2 to the feature amount of the face photograph of the user B, who is the second closest user, may also be less than the threshold value Th. In this case, it is not possible for the authentication system S to discriminate whether the user who is in front of the security gate SG is the user A or the user B.

In regard to this, one way to prevent a plurality of users having similar faces to each other from using the same passcode is to prompt the users to designate only a part of the passcode (for example, the last four digits of the passcode) at the time of use registration and to cause the authentication system S to generate the remaining part (for example, the first two digits of the passcode). However, in this case, the user is required to also remember the portion generated by the authentication system S, which is inconvenient.

Moreover, when a plurality of users having similar faces to each other use the same passcode, additional authentication may be performed in which the user is prompted to input information that is different among the users, for example, an email address or a telephone number. However, in this case as well, input for the additional authentication is required, which is inconvenient. Therefore, there is a demand for a method of enhancing security while preventing a decrease in convenience.

For example, when the feature amount of the face photograph serving as the query Q is included in a plurality of circles, it is conceivable to prepare a marginal threshold value MTb for identifying the user. The marginal threshold value MTb is a threshold value relating to a relative value of the distances d1 and d2. A large difference between the distances d1 and d2 means that the feature amount of the face photograph serving as the query Q is closer to the center of any one of the circles. In this case, the user of the face photograph serving as the query Q is highly likely to be the user corresponding to that circle. For example, when the sum of the distance d1 and the marginal threshold value MTb is less than the distance d2, the feature amount of the face photograph serving as the query Q is close to the center of the circle of the user A, and in this case, the user is authenticated as being the user A.

However, when the feature amount of the face photograph serving as the query Q is exactly at the midpoint of a plurality of circles, because the distances from the centers of all of the circles are substantially the same, it is not possible to discriminate the user even by using the marginal threshold value MTb. Therefore, the authentication system S of this embodiment processes the face photograph serving as the query Q, and then determines which one of the centers of the circles the processed face photograph is closer to.

Figure 6:
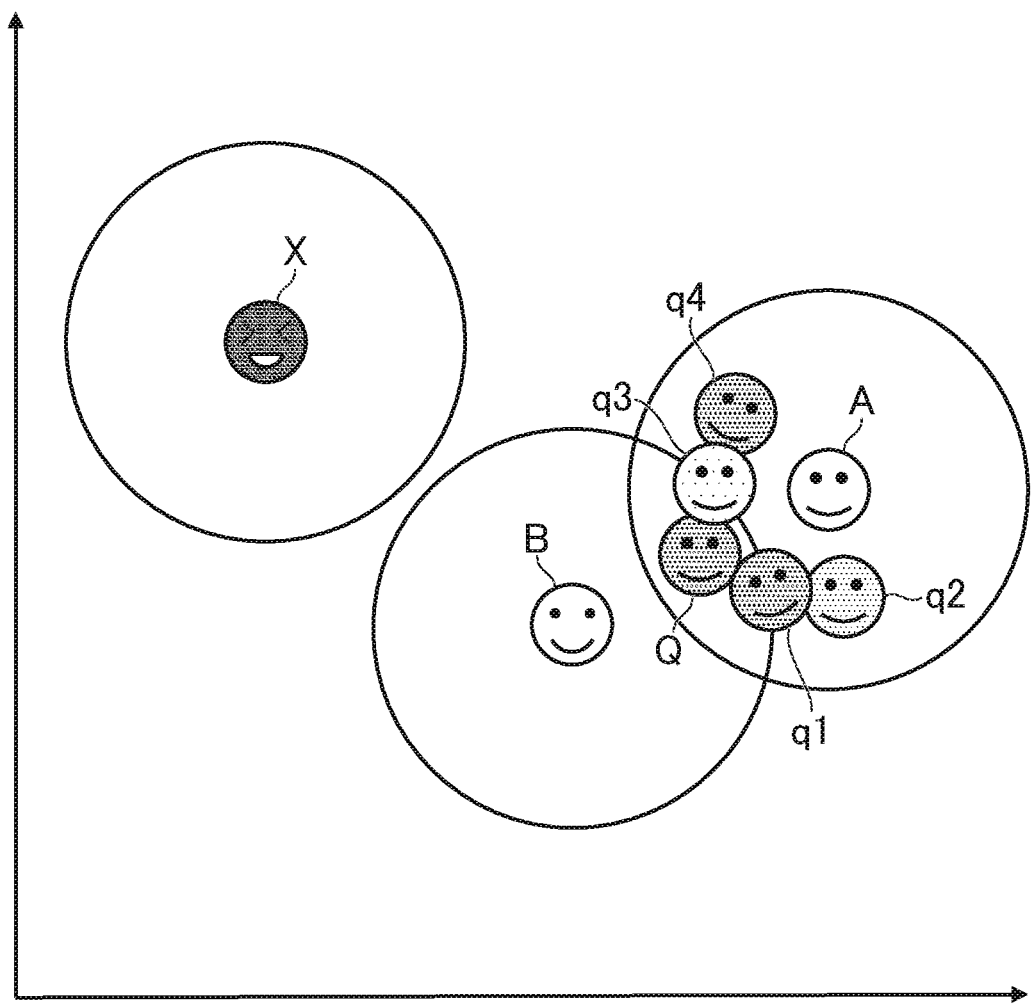
FIG. 6 is a diagram for illustrating how the face photograph serving as the query is processed.

FIG. 6 is a diagram for illustrating how the face photograph serving as the query Q is processed. As illustrated in FIG. 6, for example, the brightness and the orientation of the face photograph serving as the query Q are processed, and a plurality of face photographs are acquired. In the example of FIG. 6, there is illustrated a case in which four processed face photographs q1 to q4 are acquired. When the face photograph serving as the query Q belongs to the user A, the processed face photographs q1 to q4 have a high probability of being close to the center of the circle of the user A.

Therefore, when the processed face photographs q1 to q4 are close to the center of the circle corresponding to the user A, the authentication system S of this embodiment determines that the user who is in front of the security gate SG is the user A. In the example of FIG. 6, the feature amounts of the four processed face photographers q1 to q4 are all close to the center of the circle of the user A. In this case, there is a high probability that the user A is shown in the face photograph serving as the query Q, and therefore the authentication system S authenticates the user in front of the security gate SG as the user A.

Moreover, depending on how light hits the face during photographing by the photographing unit 36, the face photograph serving as the query Q may not be included in the circle of the relevant user, and may be included only in the circle of another user. In this case, there is a possibility that the user in front of the security gate SG is authenticated as the another user. For example, even when the user B has come in front of the security gate SG, there is the possibility that the feature amount of the face photograph serving as the query Q is slightly outside the circle of the user B and is near the inner edge of the circle of the user X.

Figure 7:
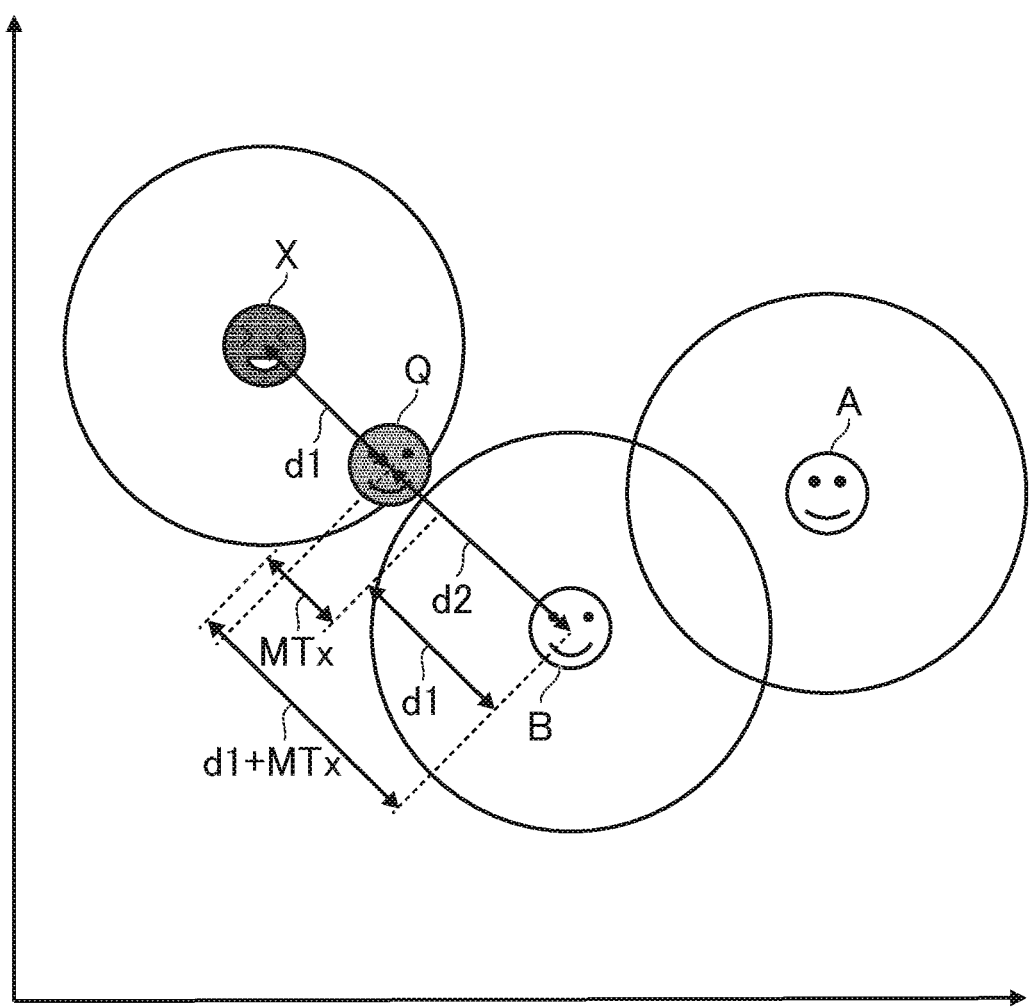
FIG. 7 is a diagram for illustrating a case in which the feature amount of the face photograph serving as the query is included only in the circle of another user.

FIG. 7 is a diagram for illustrating a case in which the feature amount of the face photograph serving as the query Q is included only in the circle of another user. As illustrated in FIG. 7, even in a case where the user B has come in front of the security gate SG, when the condition of light hitting the face is very poor, the feature amount of the face photograph of the user B serving as the query Q may be closer to the user X, and the feature amount may be included only in the circle of the user X. For example, when the feature amount closest to the feature amount of the face photograph serving as the query Q is the feature amount of the face photograph of the user X, the distance d1 between those feature amounts may be less than the threshold value Th, but the distance d2 to the feature amount of the face photograph of the relevant user B, who is the second closest user, may be equal to or more than the threshold value Th. In this case, there is a possibility that the authentication system S discriminates the user who is in front of the security gate SG as being the user X.

Therefore, in this embodiment, when the face photograph serving as the query Q is included only in the circle corresponding to one user, a marginal threshold value MTx for identifying the user is prepared. The marginal threshold value MTx may be the same value as the marginal threshold value MTb, or may be a different value. For example, when the sum of the distance d1 and the marginal threshold value MTx is less than the distance d2, this means that the feature amount of the face photograph serving as the query Q is inside the circle of the user X, but is just outside the circle of the user B. In this embodiment, in such a case, processing is performed on the face photograph serving as the query Q.

Figure 8:
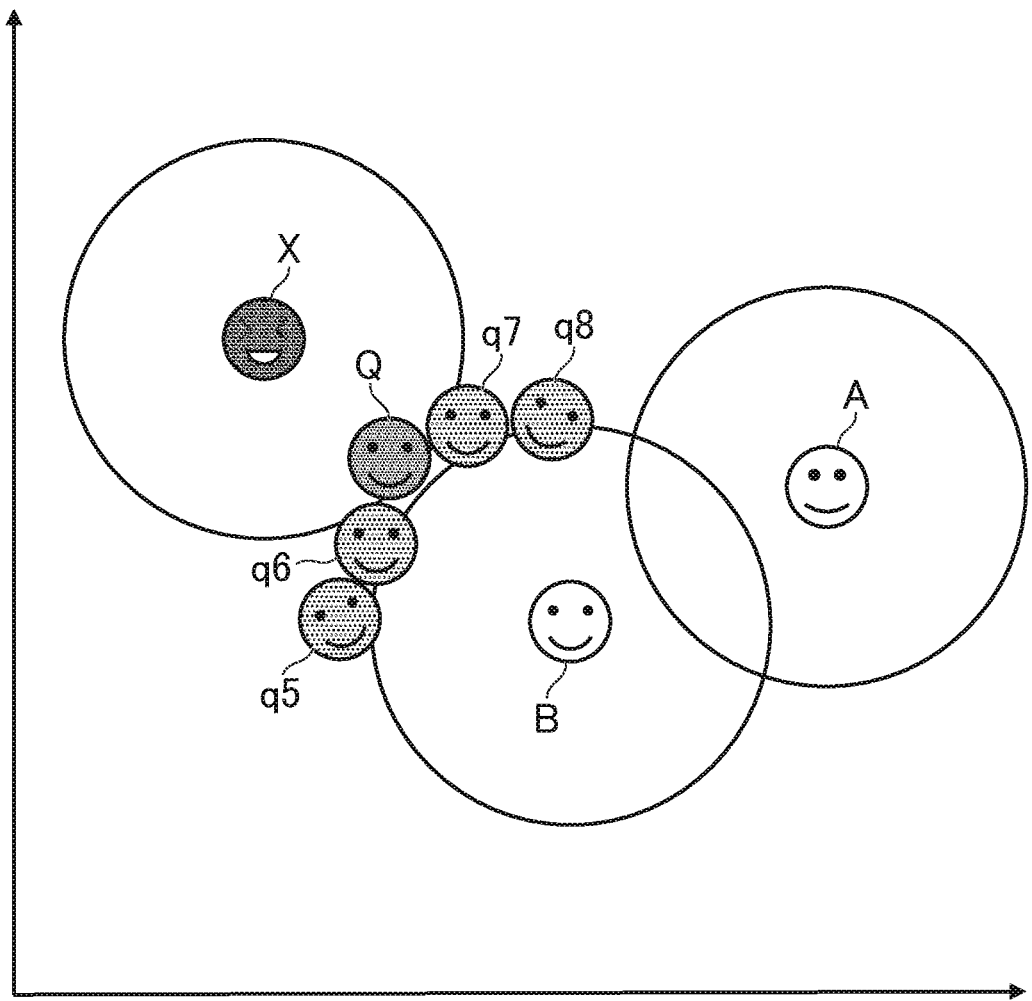
FIG. 8 is a diagram for illustrating how the face photograph serving as the query is processed.

FIG. 8 is a diagram for illustrating how the face photograph serving as the query Q is processed. As illustrated in FIG. 8, for example, the brightness and the orientation of the face photograph serving as the query Q are processed, and a plurality of face photographs are acquired. In the example of FIG. 8, there is illustrated a case in which four processed face photographs q5 to q8 are acquired, and the feature amounts of those four processed face photographers are all close to the center of the circle of the user B. In this case, there is a high probability that the user B is shown in the face photograph serving as the query Q, and therefore the authentication system S does not authenticate the user in front of the security gate SG as the user X. In this case, additional authentication may be executed, or an error message may be displayed and photographing may be performed again.

As described above, when there is the possibility that a certain user is authenticated as another user, the authentication system S of this embodiment increases the probability of authenticating the legitimate user to sufficiently enhance security by performing authentication by processing a face photograph serving as the query Q. Details of this technology are now described.

3. Functions to be Implemented by Authentication System

Figure 9:
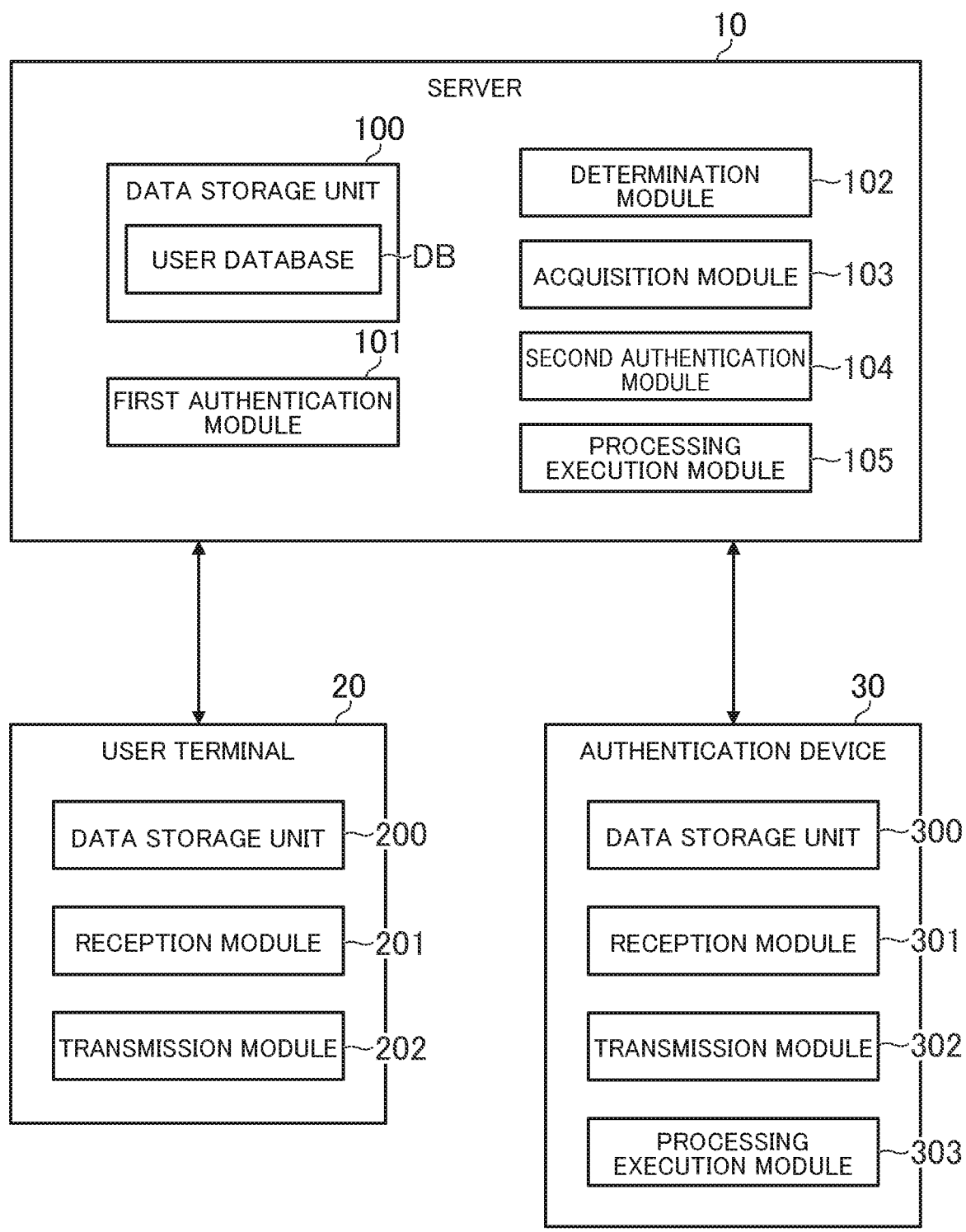
FIG. 9 is a functional block diagram for illustrating an example of functions to be implemented in the authentication system of an embodiment of the present invention.

FIG. 9 is a functional block diagram for illustrating an example of functions to be implemented by the authentication system S of this embodiment. In this example, the functions to be implemented by each of the server 10, the user terminal 20, and the authentication device 30 are described.

[3-1. Functions to be Implemented by Server]

As illustrated in FIG. 9, in the server 10, a data storage unit 100, a first authentication module 101, a determination module 102, an acquisition module 103, a second authentication module 104, and a processing execution module 105 are implemented.

[Data Storage Unit]

The data storage unit 100 is mainly implemented by the storage unit 12. The data storage unit 100 is configured to store the data required for authentication. As an example of the data stored in the data storage unit 100, there is described a user database DB, in which various types of information relating to the user are stored.

FIG. 10 is a table for showing a data storage example of the user database DB. As shown in FIG. 10, the user database DB stores a user ID, a user name, a password, data of an uploaded face photograph, a face feature amount calculated from the face photograph, a passcode, a registration date and time of the passcode, a telephone number, an email address, and the like. Those pieces of information stored in the user database DB are examples of the user information.

For example, when the user performs use registration, a new record is created in the user database DB. The new record stores the name, password, passcode, registration date and time of the passcode, telephone number, email address, face photograph, and feature amount calculated based on the face photograph in association with the user ID. When the user does not specify the user ID, the server 10 issues a new user ID.

The password, the face feature amount, and the passcode stored in the user database DB are a kind of authentication information. The telephone number and the email address can also be used in authentication, and therefore can be said to be a kind of authentication information.

The authentication information is information to be referred to during authentication. The name of the authentication information varies depending on the authentication method. For example, in the case of electronic stamp authentication, a multi-touch pattern of the stamp is the authentication information, and in the case of countersign authentication, the countersign is the authentication information. The authentication information may be used for any purpose. In this embodiment, the password is used in order for the user to perform a registration application or edit registered information, and the feature amount of the face, the passcode, the telephone number, and the email address are used in order for the user to pass through the security gate. The face photograph may also correspond to the authentication information.

The feature amount of the face is information obtained by quantifying a feature of the face, and indicates features such as a color of the face or a relative position, size, or shape of a facial part. In this embodiment, the feature amount of the face indicated by the face photograph is calculated in advance, but the feature amount of the face may be calculated on the spot at the time of authentication. When a plurality of face photographs are to be registered, the feature amount of the face is calculated for each face photograph. Various methods are applicable for the actual face authentication. For example, a method such as principal component analysis, linear discriminant analysis, elastic matching, or hidden Markov model is usable, and the feature amount is only required to be calculated by a calculation expression corresponding to those methods. For example, the feature amount of the face is assumed to be represented by a multi-dimensional vector, but the feature amount of the face may be represented in another form, such as an array or a single numerical value.

As described above, the passcode is a number having a predetermined number of digits that is used for authentication. The passcode is sometimes referred to as "personal identification number (PIN)" or "code number." The passcode and the password are similar concepts, but differ in that the passcode is composed of only numbers, whereas the password may be composed of any kind of symbol. In this embodiment, the passcode has a fixed number of digits, whereas the password can be set to have any number of digits. It is not required that the number of digits of the passcode be determined.

The information stored in the user database DB is not limited to the example of FIG. 10, and any information on the user may be stored. For example, any user information, for example, the user's date of birth, address, credit card number, or bank account number, may be stored in the user database DB. Further, for example, the data storage unit 100 may store other data. For example, the data storage unit 100 may store a learning model and training data described later.

[First Authentication Module]

The first authentication module 101 is mainly implemented by the control unit 11. The first authentication module 101 is configured to authenticate a user to be authenticated based on input authentication information that has been input and registered authentication information that has been registered.

The input authentication information is authentication information that has been input. The input authentication information is authentication information input to the computer. In other words, the input authentication information can be said to be the information to be compared with the registered authentication information or the information to serve as a query during authentication. The input authentication information may be authentication information input through a user operation, or authentication information input based on a detection result of a sensor, for example, the photographing unit 36.

For example, the input authentication information is an input image that has been input or an input feature amount corresponding to the input image. The input image is an image input to the computer. In this embodiment, a photographed image photographed by the photographing unit 36 corresponds to the input image. The input feature amount is a feature amount calculated from the input image. In this embodiment, the feature amount of the face shown in the photographed image corresponds to the input feature amount. The feature amount of the face shown in the photographed image generated by the photographing unit 36 and the passcode input to the input form F35a are each an example of input authentication information.

The registered authentication information is authentication information registered in advance. The registered authentication information is authentication information that may be a correct answer during authentication. In other words, the registered authentication information is information to be compared with the input authentication information, and is information serving as an index during authentication. The registered authentication information is registered when the use registration of the user is performed. The registered authentication information can be changed at a later time.

For example, the registered authentication information is a registered image that has been registered or a registered feature amount corresponding to the registered image. The registered image is an image registered in advance. In this embodiment, the photographed image stored in the user database DB corresponds to the registered image. The registered feature amount is the feature amount calculated from the registered image. In this embodiment, the feature amount of the face shown in the photographed image stored in the user database DB corresponds to the registered feature amount. The feature amount of the face, the passcode, the telephone number, and the email address stored in the user database DB are each an example of the registered authentication information.

The user to be authenticated is a user to be authenticated based on the input authentication information. In other words, the user to be authenticated is a user whose validity (that is, who the user is) is to be confirmed by the authentication system S. For example, like in the case of passcode authentication, when the user inputs the input authentication information by himself or herself, the user who has input the input authentication information corresponds to the user to be authenticated. Further, for example, like in the case of biometric authentication, when the input authentication information is input by detecting a user, the user to be detected corresponds to the user to be authenticated.

In this embodiment, the user to be authenticated is the user in front of the security gate SG (the user shown in the photographed image photographed by the authentication device 30). In the examples of FIG. 5 and FIG. 6, the user A shown in the face photograph serving as the query Q is the user to be authenticated, and the users B and X are other users. In the examples of FIG. 7 and FIG. 8, the user B shown in the face photograph serving as the query Q is the user to be authenticated, and the users A and X are other users.

For example, the first authentication module 101 performs authentication based on a similarity between the input authentication information and the registered authentication information. The first authentication module 101 determines that authentication has failed when the input authentication information and the registered authentication information are not similar. The expression "authentication has failed" means that none of the users for which registered authentication information has been registered are authenticated. The first authentication module 101 determines that authentication is successful when the input authentication information and the registered authentication information are similar. The expression "authentication is successful" means that any one of the users for which registered authentication information has been registered is authenticated.

A term "similar" refers to whether or not the input authentication information is similar to the registered authentication information. In other words, similarity is the difference or the discrepancy between the input authentication information and the registered authentication information. For example, in biometric authentication, the similarity between pieces of biological authentication information is determined. In biometric authentication, authentication information converted into a feature amount is used, and therefore when a difference (distance) between feature amounts is less than a threshold value, the authentication information is determined to be similar, and when the difference is equal to or more than the threshold value, the authentication information is determined not to be similar.

Further, for example, the first authentication module 101 may perform the authentication based on a match between the input authentication information and the registered authentication information. When the input authentication information and the registered authentication information do not match, the first authentication module 101 determines that authentication has failed, and when the input authentication information and the registered authentication information match, the first authentication module 101 determines that authentication is successful.

A "match" means that the input authentication information and the registered authentication information are the same. In this example, "match" means a complete match, and not a partial match. For this reason, in a case where a match of the authentication information is determined, when the authentication information is even partially different, authentication fails. For example, in passcode authentication, a match between passcodes is determined. As another example, in password authentication, a match between passwords is determined.

In this embodiment, two-step authentication is executed. Therefore, as the authentication, the first authentication module 101 performs a first authentication based on a similarity between first input authentication information and first registered authentication information, and performs a second authentication based on a match between second input authentication information and second registered authentication information.

First, the first authentication is described. The first input authentication information is the input authentication information to be used in the first authentication. The first registered authentication information is the registered authentication information to be used in the first authentication. In the first authentication, a similarity degree is calculated based on the input authentication information and the registered authentication information. The similarity degree is an index indicating the degree of similarity. In other words, the similarity degree is an index indicating the size of the difference or discrepancy between the pieces of authentication information. The similarity degree can also be said to be the probability that the authentication information is similar.

In this embodiment, there is described a case in which a distance in the vector space corresponds to the similarity degree. Therefore, there is more similarity as the distance becomes shorter, and less similarity as the distance becomes longer. The similarity degree may be indicated by a value other than the distance. For example, the similarity degree may be indicated as a single numerical value, or as a percentage between 0% and 100%. For example, when the reciprocal of the distance is used as the similarity degree, there is more similar as the similarity degree becomes larger, and less similar as the similarity degree becomes smaller.

In this embodiment, there is described a case in which the first authentication is biometric authentication. Therefore, the first input authentication information is biometric authentication information that has been input and the first registered authentication information is biometric authentication information that has been registered. Further, the feature amount of the face is described as a specific example of the biometric authentication information, and face authentication is described as a specific example of biometric authentication. For this reason, in this embodiment, the expression "feature amount of the face" may be read as "biometric authentication information," and the expression "face authentication" may be read as "biometric authentication."

The first authentication module 101 performs face authentication based on the similarity between the input feature amount of the face and the registered feature amount of the face. For example, when the face of the user is to be photographed by the authentication device 30, the first authentication module 101 calculates the input feature amount of the face based on the image photographed by the authentication device 30. The first authentication module 101 also refers to the user database DB to acquire the registered feature amount of the face. When the input feature amount of the face and the registered feature amount of the face are similar, the first authentication module 101 determines that authentication is successful, and determines that authentication has failed when the input feature amount of the face and the registered feature amount of the face are not similar.

In this embodiment, there is described a case in which a distance (for example, difference between feature amounts) between vectors indicated by each feature amount is used as the similarity degree, but a value obtained by substituting those feature amounts into a predetermined calculation formula (for example, a calculation formula weighted for each element of the vectors indicated by the feature amounts) may also be used as the similarity degree. The first authentication module 101 determines that authentication has failed when the distance is equal to or more than the threshold value Th, and determines that authentication is successful when the distance is less than the threshold value Th.

When the face photograph itself is used as the first authentication information in place of the feature amount of the face, the first authentication module 101 may calculate the similarity degree between an input face photograph and a registered face photograph. Various methods are applicable as the method of calculating the similarity degree between the input face photograph and the registered face photograph. For example, a method of calculating a difference between pixel values of pixels in the images may be used, or the similarity degree calculation used in machine learning may be used.

Next, the second authentication is described. The second input authentication information is the input authentication information to be used in the second authentication. The second registered authentication information is the registered authentication information to be used in the second authentication. In this embodiment, as an example, there is described a case in which the second input authentication information and the second registered authentication information are each a passcode having a predetermined number of digits, and the second authentication is passcode authentication. Therefore, the term "passcode" in this embodiment may be read as "second input authentication information" or "second registered authentication information," and the term "passcode authentication" may be read as "second authentication."

The first authentication module 101 performs passcode authentication based on a match between an input passcode and a registered passcode. The first authentication module 101 determines that authentication is successful when the input passcode and the registered passcode match, and determines that authentication has failed when the input passcode and the registered passcode do not match.

In this embodiment, passcode authentication is executed first in order to narrow down the feature amounts of the faces to be compared in face authentication, and therefore all of the passcodes registered in the user database DB are compared. For this reason, the first authentication module 101 identifies all records storing a passcode matching the input passcode. The first authentication module 101 determines that authentication has failed when no records matching the input passcode are found, and determines that the authentication is successful when even one record matching the input passcode is found. The feature amount of the face stored in the record that is found when authentication is successful is the feature amount to be compared in face authentication.

Contrary to this embodiment, biometric authentication, which is the first authentication, may be executed first, and passcode authentication, which is the second authentication, may be executed later. In this case, all the feature amounts of the faces registered in the user database DB are compared in biometric authentication, and the passcodes to be compared in passcode authentication are narrowed down. In this case, only the passcodes stored in the records for which biometric authentication is determined to be successful are compared in passcode authentication.

The first authentication module 101 may acquire, based on the learning model, the similarity degree between the input authentication information and the registered authentication information, and perform the authentication based on the acquired similarity degree. The learning model is a model used in machine learning. Various known methods can be used for machine learning itself. For example, methods such as neural network, reinforcement learning, or deep learning can be used. The machine learning is not limited to supervised machine learning, and semi-supervised machine learning or unsupervised machine learning may be used.

In this embodiment, the learning model learns which user the registered authentication information belongs to. That is, the learning model learns the features of the faces of the users for which use registration has been completed. For example, the learning processing of the learning model is executed based on training data in which registered authentication information is used as an input (question) and a user ID serving as a label is used as an output (answer). For the learning itself, any learning method used in machine learning can be used. The learning model in which the training data has been learned can discriminate which user the input authentication information that has been input belongs to. That is, the learning model labels the input authentication information.

For example, the learning model outputs, for each user (for each label), a probability (score) that the input authentication information belongs to the relevant user. The first authentication module 101 acquires this probability as the similarity degree. The learning model may also calculate the feature amount when a face photograph is input. In this case, the first authentication module 101 may acquire the feature amount calculated by the learning model as the input authentication information.

[Determination Module]

The determination module 102 is mainly implemented by the control unit 11. The determination module 102 is configured to determine whether or not there is a possibility that the user to be authenticated is authenticated as another user. The term "another user" means a user other than the user to be authenticated. The expression "possibility that the user is authenticated as another user" means the possibility that the user to be authenticated is falsely rejected as a user who is not the user to be authenticated. This possibility is hereinafter referred to as "possibility of false rejection."

In this embodiment, the authentication is performed based on the similarity between the input authentication information and the registered authentication information. Therefore, for example, the determination module 102 determines that there is the possibility of false rejection when a plurality of pieces of the registered authentication information are similar to the input authentication information. For example, a state in which the user to be authenticated is authenticated as each of a plurality of users including the user to be authenticated and another user corresponds to the state in which there is the possibility of false rejection. As in the example of FIG. 5, a state in which the distances d1 and d2 are both less than the threshold value Th and the users A and B can both be successfully authenticated corresponds to the state in which there is the possibility of false rejection.

Further, for example, the determination module 102 may acquire the similarity degree between the input authentication information and each of the plurality of pieces of registered authentication information, and determine whether or not there is the possibility of false rejection based on a difference between those acquired similarity degrees. In this embodiment, the distance corresponds to the similarity degree, and therefore the determination module 102 determines whether or not there is the possibility of false rejection based on the difference between the distance of each piece of registered authentication information. When the difference is equal to or more than a threshold value, there is no possibility of false rejection, and when the difference is less than the threshold value, there is the possibility of false rejection. As in the example of FIG. 5, when the sum of the distance d1 and the marginal threshold value MTb is less than the distance d2 (when the difference between the distance d2 and the distance d1 is equal to or more than the marginal threshold value MTb), there is no possibility of false rejection, and when this sum is equal to or more than the distance d2 (when the difference between the distance d2 and the distance d1 is less than the marginal threshold value MTb), there is the possibility of false rejection.

For example, the determination module 102 may acquire the similarity degree of the registered authentication information determined to be similar to the input authentication information and the similarity degree of the registered authentication information determined not to be similar to the input authentication information, and determine whether or not there is the possibility of false rejection based on a difference between those acquired similarity degrees. When the difference is equal to or more than a threshold value, there is no possibility of false rejection, and when the difference is less than the threshold value, there is the possibility of false rejection. When the sum of the distance d1 and the marginal threshold value MTx is less than the distance d2 (when the difference between the distance d2 and the distance d1 is equal to or more than the marginal threshold value MTx), there is no possibility of false rejection, and as in the example of FIG. 7, when this sum is equal to or more than the distance d2 (when the difference between the distance d2 and the distance d1 is less than the marginal threshold value MTx), there is the possibility of false rejection. That is, the state in which the user to be authenticated is authenticated as another user without being authenticated as the user to be authenticated corresponds to the state in which there is the possibility of false rejection.

In this embodiment, two-step authentication is executed. Therefore, the determination module 102 determines whether or not there is the possibility that the user to be authenticated is authenticated as another user in both the first authentication and the second authentication. The method of determining the possibility of false rejection in the first authentication is as described above. The second authentication is determined based on a match between pieces of authentication information. Therefore, for example, when there are a plurality of pieces of the registered authentication information matching the input authentication information, there is the possibility of false rejection in the second authentication. The determination module 102 determines that there is the possibility of false rejection when there is the possibility of false rejection in the first authentication and there is the possibility of false rejection in the second authentication.

[Acquisition Module]

The acquisition module 103 is mainly implemented by the control unit 11. The acquisition module 103 is configured to acquire, when it is determined that there is the possibility of false rejection, processed authentication information obtained by processing at least one of the input authentication information or the registered authentication information.

The term "processed authentication information" refers to authentication information that has been processed. In this embodiment, there is described a case in which information obtained by processing the input authentication information corresponds to the processed authentication information, but as described in modification examples of the present invention later, authentication information obtained by processing the registered authentication information may correspond to the processed authentication information. Further, the processed authentication information may be authentication information obtained by processing both the input authentication information and the registered authentication information. For example, the processed authentication information is a processed image obtained by processing at least one of the input image or the registered image, or a processed feature amount corresponding to the processed image. As another example, the processed authentication information is processed biometric authentication information.

The term "processing" means changing the content of the information. Processing can also be referred to as "editing" or "modifying." For example, when the authentication information is an image, changing the color, brightness, orientation, subject angle, size, or resolution of the image corresponds to "processing." That is, changing the photographing conditions corresponds to "processing." Further, for example, when the authentication information is the multi-touch pattern in electronic stamp authentication, changing at least one touch position indicated by the multi-touch pattern corresponds to "processing." Moreover, for example, when the authentication information is a handwriting pattern in handwriting authentication, changing the trajectory or speed of the handwriting corresponds to "processing." Still further, for example, when the authentication information is a voice pattern in voice authentication, changing the frequency indicated by the voice corresponds to "processing."

The acquisition module 103 may acquire only one piece of processed authentication information, but in this embodiment, the acquisition module 103 acquires a plurality of pieces of processed authentication information obtained by subjecting the input authentication information to different processing. Each piece of processed authentication information is obtained by performing processing different from processing for the other pieces of processed authentication information. For example, when the authentication information is an image, a different amount of change in the color, brightness, orientation, size, or resolution corresponds to "different processing." Further, for example, a different orientation corresponds to "different processing." The same applies to the other types of authentication information described above. The processed authentication information may be any processed authentication information which has content different from that of the other pieces of processed authentication information and in which the content of the input authentication information has been changed.

The acquisition module 103 acquires, when it is determined that there is the possibility of false rejection, the processed authentication information by processing the input authentication information. The acquisition module 103 processes the input authentication information on condition that it is determined that there is the possibility of false rejection. The acquisition module 103 may process the input authentication information based on a processing method determined in advance. For example, the acquisition module 103 may acquire the processed authentication information by using a learning model for processing an image. In this case, the learning model learns a relationship between the image before processing and the image after processing. The acquisition module 103 inputs the image serving as the input authentication information into the learning model, and acquires the processed image output from the learning model as the processed authentication information. The acquisition module 103 may acquire the processed authentication information by using a learning model even for authentication information other than an image. In place of a learning model, the processed authentication information may be acquired by an algorithm defining the processing method. In this case, the algorithm shows the relationship between the authentication information before processing and the authentication information after processing.

[Second Authentication Module]

The second authentication module 104 is mainly implemented by the control unit 11. The second authentication module 104 is configured to perform, when it is determined that there is the possibility of false rejection, authentication based on the processed authentication information. In this embodiment, the processed authentication information is information obtained by processing the input authentication information. Therefore, the second authentication module 104 performs authentication based on the processed authentication information and the registered authentication information. The authentication method itself may be the same as the method described for the first authentication module 101. When the same authentication method as that of the first authentication module 101 is used, the term "input authentication information" described for the processing of the first authentication module 101 may be read as "processed authentication information."

In this embodiment, the second authentication module 104 determines whether or not the processed authentication information is more similar to the registered authentication information than to the input authentication information, and performs authentication based on the determination result. The second authentication module 104 performs the determination by comparing the similarity degree between the input authentication information and the registered authentication information with the similarity degree between the processed authentication information and the registered authentication information. For example, the second authentication module 104 may determine that the authentication has failed when the similarity degree between the input authentication information and the registered authentication information is higher than the similarity degree between the processed authentication information and the registered authentication information, and determine that the authentication is successful when the similarity degree between the processed authentication information and the registered authentication information is higher than the similarity degree between the input authentication information and the registered authentication information. For example, when the processed authentication information is more similar to the registered authentication information than to the input authentication information, the second authentication module 104 determines that authentication is successful for the user of the registered authentication information, and when the processed authentication information is not more similar to the registered authentication information than to the input authentication information, the second authentication module 104 determines that authentication has failed.

For example, the second authentication module 104 may determine whether or not a predetermined number or more of the pieces of the processed authentication information are more similar to the registered authentication information than to the input authentication information, and perform the authentication based on the determination result. In this embodiment, this predetermined number is the total number of the plurality of pieces of the processed authentication information that are similar to the input authentication information. The second authentication information determines whether or not all of the pieces of the processed authentication information are more similar to the registered authentication information than to the input authentication information, and performs the authentication based on the determination result. The predetermined number is not required to be the total number of the plurality of pieces of the processed authentication information that are similar to the input authentication information, and may be a partial number of those plurality of pieces of the processed authentication information.

Moreover, the second authentication module 104 may acquire a similarity degree corresponding to the processed authentication information based on a learning model, and perform the authentication based on the similarity degree. The method of acquiring the similarity degree by using the learning model may be the same as the method of acquiring the similarity degree by the first authentication module 101. The second authentication module 104 may input the processed authentication information to the learning model and acquire the processed authentication information output from the learning model.

[Processing Execution Module]

The processing execution module 105 is mainly implemented by the control unit 11. The processing execution module 105 is configured to execute predetermined processing when authentication is successful. The predetermined processing is processing permitted to be executed when authentication is successful. In this embodiment, there is described a case in which processing for unlocking the security gate SG corresponds to the predetermined processing, but any processing is applicable as the predetermined processing. Examples of the predetermined processing include login processing to a server or a terminal, processing of unlocking a computer, processing of permitting data browsing, processing of permitting data writing, processing of opening and closing an automatic door, processing of permitting electronic voting, and processing of permitting acquisition of a public document.

The processing execution module 105 itself may control the unlocking, but in this embodiment, a processing execution module 303 of the authentication device 30 executes the unlocking control, and therefore the processing execution module 105 notifies an authentication result to the authentication device 30. For example, when at least one of the two types of authentication fails, the processing execution module 105 does not transmit a notification indicating that authentication has been successful, and when all the two types of authentication are successful, transmits a notification indicating that authentication has been successful. When the authentication by the user has not been successful a certain number of times, the authentication information on the record storing the passcode input by the user or the record storing the feature amount similar to the face of the user may be locked and prevented from being used.

[3-2. Functions to be Implemented by User Terminal]

As illustrated in FIG. 9, in the user terminal 20, a data storage unit 200, a reception module 201, and a transmission module 202 are implemented. In this embodiment, there is described a case in which the user terminal 20 is included in the authentication system S, but the user terminal 20 may be an external device that can communicate to and from the authentication system S.

[Data Storage Unit]

The data storage unit 200 is mainly implemented by the storage unit 22. The data storage unit 200 is configured to store the data required for the registration application. For example, the data storage unit 200 stores data of the face photograph of the user. The data storage unit 200 may also store a user ID and a password.

[Reception Module]

The reception module 201 is mainly implemented by the control unit 21. The reception module 201 is configured to receive input operations for the user to perform a registration application. For example, the reception module 201 receives input of the user ID, the password, the file name of the face photograph, the passcode, the telephone number, and the email address. The input operations received by the reception module unit 201 are not limited to those input operations, and various other input operations can be received.

[Transmission Module]

The transmission module 202 is mainly implemented by the control unit 21. The transmission module 202 is configured to transmit data for performing the registration application, based on an input operation received by the reception module 201. For example, the transmission module 202 transmits the user ID, the password, the face photograph data, the passcode, the telephone number, and the email address to the server 10 based on the input operations by the user. The data transmitted by the transmission module 202 is not limited to those pieces of data, and various other data can be transmitted.

[3-3. Functions to be Implemented by Authentication Device]

As illustrated in FIG. 9, in the authentication device 30, a data storage unit 300, a reception module 301, a transmission module 302, and the processing execution module 303 are implemented. In this embodiment, there is described a case in which the authentication device 30 is included in the authentication system S, but the authentication device 30 may be an external device that can communicate to and from the authentication system S.

[Data Storage Unit]

The data storage unit 300 is mainly implemented by the storage unit 32. The data storage unit 300 is configured to store the data required for authentication. For example, the data storage unit 300 stores information on the IP address of the server 10 and the like. As another example, the data storage unit 300 stores data (e.g., HTML data or image data) for displaying the input forms F35*a* and F35*b* and the like on the display unit 35.

[Reception Module]

The reception module 301 is mainly implemented by the control unit 31. The reception module 301 is configured to receive input operations. The input operations may be input operations required for authentication. In this embodiment, an input operation of the user is not required for face authentication, and hence the reception module 301 receives a passcode input operation. For example, the reception module 301 receives input of the passcode to the input form F35*a*.

It is sufficient for the reception module 301 to receive an input operation corresponding to the type of authentication to be used by the authentication system S. For example, when fingerprint authentication is to be used, an input operation of the user placing a finger on a camera, a sensor, or the like is received. As another example, when handwriting authentication is to be used, an input operation of the user writing characters on a touch panel or the like is received. As another example, when password authentication or countersign authentication is to be used, the reception module 301 receives an operation of inputting a password or a countersign. A microphone may be arranged in the authentication device 30, and the countersign may be detected by the microphone.

[Transmission Module]

The transmission module 302 is mainly implemented by the control unit 31. The transmission module 302 is configured to transmit information required for authentication, based on the input operation. The transmission module 302 may transmit the authentication information itself or may transmit information for identifying the authentication information.

In this embodiment, there is described a case in which the first authentication module 101 and the second authentication module 104 are implemented by the server 10, and therefore there is described a case in which the transmission module 202 transmits the data to the server 10. However, when the first authentication module 101 and the second authentication module 104 are implemented by another computer, the data may be transmitted to the another computer. For example, when the first authentication module 101 and the second authentication module 104 are to be implemented by different computers, the transmission module 202 is only required to transmit the information to those computers.

In this embodiment, the first authentication is face authentication and the second authentication is passcode authentication, and therefore the transmission module 302 transmits an image (face photograph) photographed by the photographing unit 36 and the passcode input to the input form F35*a*. The feature amount of the face may be calculated on the authentication device 30 side, and in this case, the transmission module 302 transmits the calculated feature amount of the face in place of the image.

It is sufficient for the transmission module 302 to transmit information corresponding to the type of authentication to be used by the authentication system S. For example, when fingerprint authentication is to be used, the transmission module 302 may transmit an image of the finger of the user, or a feature amount of the finger calculated from the image may be transmitted. As another example, when handwriting authentication is to be used, the transmission module 302 may transmit an image of characters written on a touch panel or the like by the user, or may transmit coordinate information indicating a change in touch position. As another example, when password authentication or countersign authentication is to be used, the transmission module 302 transmits a password or countersign input by the user.

[Processing Execution Module]

The processing execution module 303 is mainly implemented by the control unit 31. The processing execution module 303 is configured to execute predetermined processing when authentication is successful. The processing execution module 303 executes the predetermined processing when the two types of authentication, namely, the first authentication and the second authentication, are successful. The meaning of the predetermined processing is as described above, and is processing permitted to be executed when authentication is successful.

In this embodiment, when all the two types of authentication are successful, the security gate SG is unlocked. Therefore, when a notification indicating that authentication is successful is received, the processing execution module 303 unlocks the lock by causing a motor or the like of the lock mechanism to rotate, and when a notification indicating that the authentication is successful is not received, the processing execution module 303 does not unlock the lock. When all the two types of authentication are successful, the processing execution module 105 of the server 10 may transmit a signal for unlocking the lock mechanism in place of a notification indicating that authentication is successful. In this case, the processing execution module 303 of the authentication device 30 is only required to unlock the lock based on the signal.

4. Processing to be Executed in this Embodiment

Figure 11:
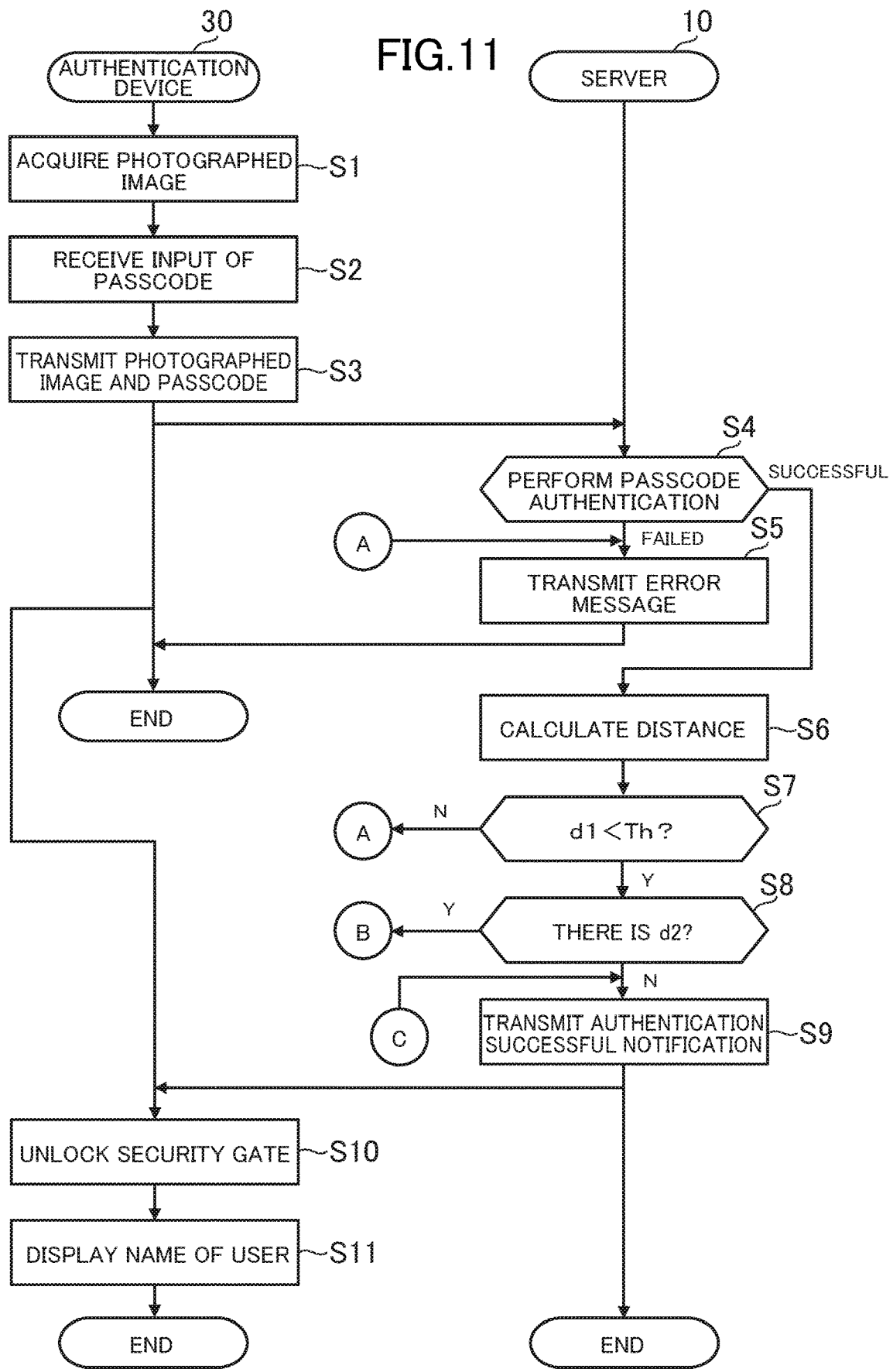
FIG. 11 is a flowchart for illustrating an example of processing to be executed in this embodiment.
Figure 12:
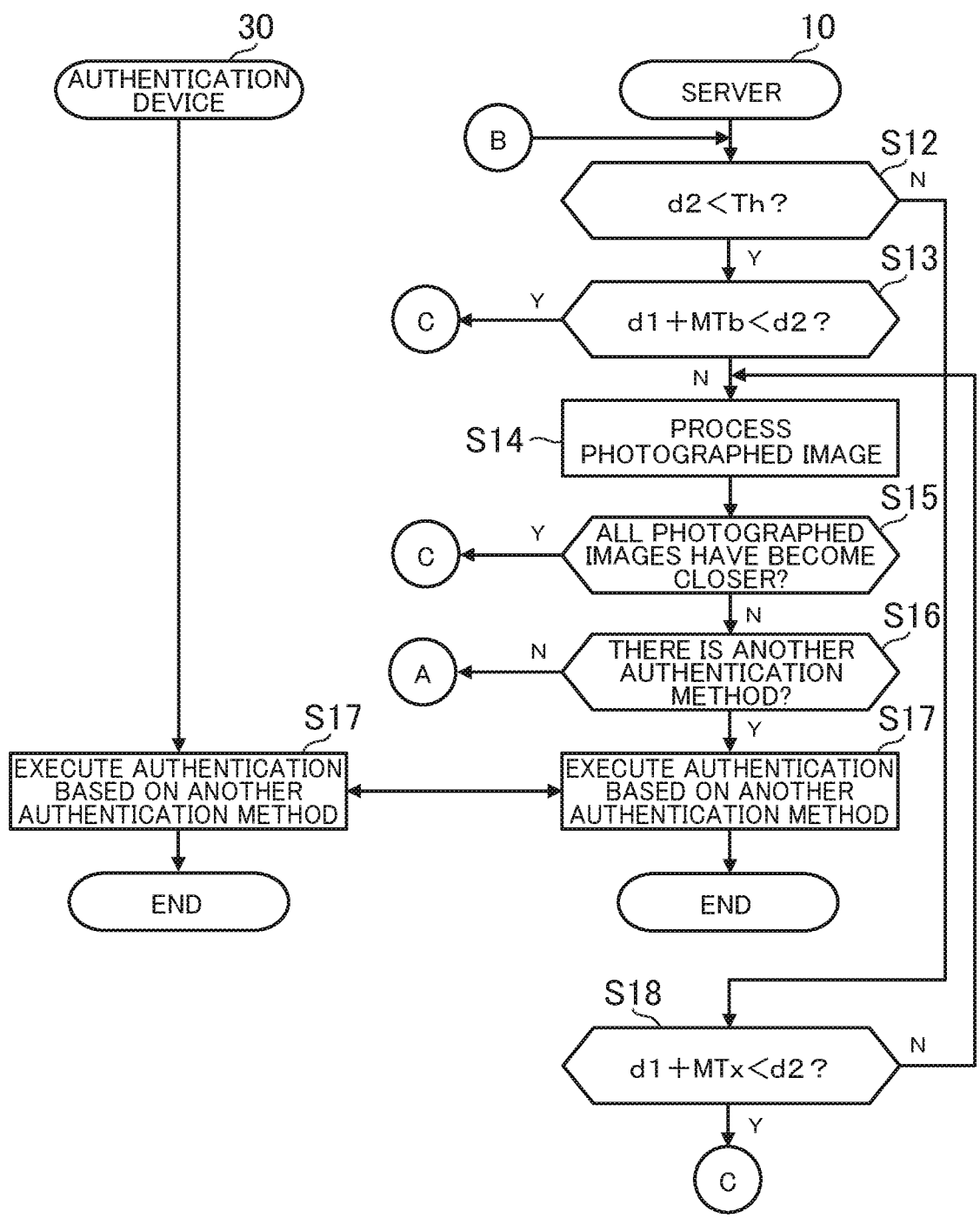
FIG. 12 is a flowchart for illustrating an example of processing to be executed in this embodiment.

FIG. 11 and FIG. 12 are flowcharts for illustrating an example of authentication processing to be executed in this embodiment. The authentication processing illustrated in FIG. 11 and FIG. 12 is executed by the control units 11 and 31 operating in accordance with programs stored in the storage units 12 and 32, respectively. The processing described below is an example of processing to be executed by the functional blocks illustrated in FIG. 9. When authentication processing is to be executed, it is assumed that use registration is complete.

As illustrated in FIG. 11, first, in the authentication device 30, the control unit 31 acquires a photographed image based on a detection signal of the photographing unit 36 (Step S1). In Step S1, the control unit 31 acquires a photographed image generated by the photographing unit 36, and displays the acquired photographed image in the display area A35 of the display unit 35. The input form F35a and the button B35a are also displayed on the display unit 35, and the display unit 35 can receive input of the passcode by the user.

The control unit 31 receives input of the passcode by the user based on a detection signal of the operation unit 34 (Step S2). In Step S2, the control unit 31 receives input of the four-digit passcode to the input form F35a. For example, a software numeric keypad for inputting the passcode is displayed on the display unit 35. In this embodiment, the passcode has four digits, but the passcode may have any number of digits. For example, the passcode may be less than four digits, or five digits or more.

The control unit 31 transmits, in response to the user selecting the button B35a, the photographed image acquired in Step S1 and the passcode input in Step S2 to the server 10 (Step S3).

In the server 10, when the photographed image and the passcode are received, the control unit 11 performs passcode authentication based on the user database DB (Step S4). In Step S4, the control unit 11 determines whether or not there is a user having a matching passcode. When there is a user having a matching passcode, authentication is successful, and when there is no user having a matching passcode, authentication fails.

In this embodiment, all users who have a matching passcode are identified. Therefore, in Step S4, the control unit 11 executes the search by using the four-digit passcode input by the user as a query and the four-digit passcodes stored in the user database DB as an index. In this search, a complete match between the passcodes is determined. When a complete match is retrieved, authentication is successful, and when a complete match is not retrieved, authentication fails.

When passcode authentication fails (Step S4: Failure), the control unit 11 transmits a predetermined error message to the authentication device 30 (Step S5), and the processing ends. In this case, the error message is displayed on the display unit 35 of the authentication device 30 to notify the user that authentication fails.

Meanwhile, when passcode authentication is successful (Step S4: Successful), the control unit 11 calculates the distance between the feature amount of the face of the photographed image received in Step S4 (feature amount of the face photograph serving as the query) received in Step S4 and the feature amount of the face of the user having a matching passcode (Step S6). In Step S6, the control unit 11 calculates the distance between those feature amounts in the vector space. When there are a plurality of feature amounts of faces of users having matching passcodes, the control unit 11 calculates the distance for each of those feature amounts.

The control unit 11 determines whether or not the shortest distance d1 among the distances calculated in Step S6 is less than the threshold value Th (Step S7). When it is not determined that the distance d1 is less than the threshold value Th (Step S7: N), this means that there is no similarity to the face of any of the users. Therefore, the processing returns to Step S5, and an error message is transmitted.

Meanwhile, when it is determined that the distance d1 is less than the threshold value Th (Step S7: Y), the control unit 11 determines whether or not there is a second shortest distance d2 among the distances calculated in Step S6 (Step S8). When there is only one distance calculated in Step S6 (that is, when there is only one face photograph having a matching passcode), the determination in Step S8 is "no (N)".

When it is not determined that there is a distance d2 (Step S8: N), this means that there is only one user having the same passcode and having a sufficiently close distance d1, and therefore the control unit 11 transmits, to the authentication device 30, an "authentication successful" notification indicating that authentication has been successful (Step S9).

The authentication successful notification is performed by transmitting data having a predetermined format, and includes the name of the user for which authentication has been successful.

In the authentication device 30, when the notification is received, the control unit 31 unlocks the security gate SG (Step S10), displays the name of the user for which authentication has been successful on the display unit 35 (Step S11), and the processing ends. The user confirms that his or her name is displayed on the display unit 35, and pushes the door of the security gate to pass through the security gate. In this case, information such as the name of the user and the current date and time may remain in the server 10 as a traffic record.

Meanwhile, when it is determined in Step S8 that there is a distance d2 (Step S8: Y), the processing advances to FIG. 12, and the control unit 11 determines whether or not the distance d2 is less than the threshold value Th (Step S12). When it is determined that the distance d2 is less than the threshold value Th (Step S12: Y), the control unit 11 determines whether or not the sum of the distance d1 and the marginal threshold value MTb is less than the distance d2 (Step S13).

When it is determined that the sum of the distance d1 and the marginal threshold value MTb is less than the distance d2 (Step S13: Y), the processing returns to Step S9. In this case, the distance d1 is sufficiently shorter than the distance d2, and hence there is a very high probability that the user is the user corresponding to the distance d1. Therefore, it is determined that the user corresponding to the distance d1 has been authenticated.

Meanwhile, when it is not determined that the sum of the distance d1 and the marginal threshold value MTb is less than the distance d2 (Step S13: N), the control unit 11 processes the photographed image (the face photograph serving as the query) (Step S14). In Step S14, for example, the control unit 11 changes the brightness of the photographed image or changes the orientation of the photographed image to obtain a predetermined number of processed images.

The control unit 11 determines, based on the distance between the feature amount of each processed image and the feature amount of the face photograph of the user corresponding to the distance d1, whether or not the feature amounts of all the processed images have become closer to the feature amount of the face photograph of the distance d1 (Step S15). In Step S15, the control unit 11 calculates the distance for each processed image, and determines whether or not the calculated distance is shorter than the distance d1. When even one distance is longer than the distance d1, the determination in Step S15 is "no (N)".

When it is determined that the feature amounts of all the processed images have become closer (Step S15: Y), the processing returns to Step S9. In this case, the feature amounts of all the processed images are similar to the user corresponding to the distance d1, and hence there is a very high probability that the user is the user corresponding to the distance d1. Therefore, it is determined that the user corresponding to the distance d1 has been authenticated.

Meanwhile, when it is not determined that the feature amounts of all the processed images have become closer (Step S15: N), the control unit 11 determines whether or not there is another authentication method (Step S16). The "another authentication method" may be any authentication method other than passcode authentication and face authentication. For example, the user may be prompted to input his or her email address or telephone number, or to input a password longer and more complicated than the passcode.

When it is determined that there is another authentication method (Step S16: Y), authentication based on the another authentication method is executed between the server 10 and the authentication device 30 (Step S17), and the processing ends. In this case, authentication based on another authentication method using, for example, an email address or a telephone number, is executed between the server 10 and the authentication device 30. When this authentication is successful, the same processing as that in Step S9 to Step S11 is executed. When this authentication fails, the same processing as that in Step S8 is executed, and an error message is transmitted.

Meanwhile, when it is not determined that there is another authentication method (Step S16: N), the processing returns to Step S5, an error message is transmitted, and the processing ends. In this case, an error message is displayed on the display unit 35 of the authentication device 30 to notify the user that the authentication has not been successful.

When it is not determined in Step S12 that the distance d2 is less than the threshold value Th (Step S12: N), the control unit 11 determines whether or not the sum of the distance d1 and the marginal threshold value MTx is less than the distance d2 (Step S18). When it is determined that the sum of the distance d1 and the marginal threshold value MTx is less than the distance d2 (Step S18: Y), the processing returns to Step S9. In this case, the distance d1 is sufficiently shorter than the distance d2, and hence there is a very high probability that the user is the user corresponding to the distance d1. Therefore, it is determined that the user corresponding to the distance d1 has been authenticated.

Meanwhile, when it is not determined that the sum of the distance d1 and the marginal threshold value MTx is less than the distance d2 (Step S18: N), the processing returns to Step S14. In this case, there is little difference between the distance d1 and the distance d2, and there is the possibility of false rejection like the state illustrated in FIG. 7. Therefore, the processing of Step S14 is executed to process the photographed image, and the processing of Step S15 is executed.

According to the authentication system S of this embodiment, when there is the possibility of false rejection, impersonation can be prevented and security can be enhanced by acquiring processed authentication information and performing authentication. For example, when a part of the passcode is generated on the authentication system S side, it is more difficult to remember the passcode and convenience is reduced. However, according to the authentication system S, the length of the passcode does not change even when two-step authentication is employed, and therefore it is possible to prevent such a reduction in convenience. Moreover, for example, in a case where additional authentication information such as an email address or a telephone number is input, the input becomes complicated and convenience is reduced, but according to the authentication system S, it is not required to input additional authentication information, and therefore such a reduction in convenience can be prevented.

The authentication system S can enhance security by determining whether or not processed authentication information obtained by processing the input authentication information is more similar to the registered authentication information than to the input authentication information, and performing authentication based on the determination result. For example, it is possible to prevent false rejection from occurring by authenticating a user having registered authentication information to which the processed authentication information has become closer in the vector space.

The authentication system S can comprehensively analyze a plurality of pieces of processed authentication information to effectively enhance security by determining whether or not a predetermined number or more of the pieces of processed authentication information are more similar to the registered authentication information than to the input authentication information, and performing the authentication based on the determination result.

The authentication system S can effectively enhance security by determining whether or not all of the pieces of the created processed authentication information are more similar to the registered authentication information than to the input authentication information, and performing the authentication based on the determination result.

The authentication system S can accurately determine the possibility of false rejection to enhance security by determining that there is the possibility of false rejection when a plurality of pieces of the registered authentication information are similar to the input authentication information.

The authentication system S can accurately determine the possibility of false rejection to enhance security by acquiring the similarity degree between the input authentication information and each of a plurality of pieces of registered authentication information, and determining whether or not there is the possibility of false rejection based on a difference between the acquired similarity degrees. For example, as illustrated in FIG. 5, even in a case where the distance of each of the plurality of pieces of the registered authentication information is less than the threshold value Th, through use of the marginal threshold value MTb to consider a relative relationship of the distances, when there is a very high probability that the user is a certain specific user, by authenticating the user, it is possible to accurately determine the possibility of false rejection and to save the time and effort involved in performing authentication again and the time and effort involved in inputting additional authentication. Moreover, it is possible to perform authentication without creating processed authentication information, to thereby speed up the authentication. In addition, the processing load on the server 10 can be reduced by omitting the time and effort required to create the processed authentication information.

The authentication system S can accurately determine the possibility of false rejection to enhance security by acquiring the similarity degree of the registered authentication information determined to be similar to the input authentication information and the similarity degree of the registered authentication information determined not to be similar to the input authentication information, and determining whether or not there is the possibility of false rejection based on the difference between those acquired similarity degrees. For example, as illustrated in FIG. 7, even when only the distance to the registered authentication information of another user is less than the threshold value Th, through use of the marginal threshold value MTx to consider a relative relationship of the distances, the possibility of being authenticated as the another user is reduced, and the occurrence of false rejection can be suppressed.

The authentication system S can effectively enhance security by employing two-step authentication for determining, based on a first authentication that is based on a similarity between first input authentication information and first registered authentication information and a second authentication that is based on a match between second input authentication information and second registered authentication information, whether or not there is the possibility of false rejection in which the user to be authenticated is authenticated as another user.

The authentication system S can perform the authentication based on a similarity degree acquired by using a learning model, to thereby be able to increase a calculation accuracy of the similarity degree to enhance security.

The authentication system S can enhance security when performing authentication using an image by using each of the input authentication information, the registered authentication information, and the processed authentication information as an image or a feature amount corresponding to the image.

The authentication system S can enhance security when performing biometric authentication by using biometric authentication as the authentication and using processed biometric authentication information to perform the biometric authentication.

When it is determined that there is the possibility of false rejection, the authentication system S can acquire processed authentication information by processing the input authentication information, to thereby enable processed authentication information to be acquired on the spot and security to be enhanced. For example, compared with a case in which the processed authentication information is created in advance and stored in the user database DB, the processed authentication information may be created on the spot, to thereby enable the memory consumption of the server 10 to be reduced.

5. Modification Examples

The modes of the present invention are not limited to the embodiment described above, and can be modified suitably without departing from the spirit of the modes of the present invention.

(1) For example, in the embodiment, there is described a case in which the processed authentication information is obtained by processing the input authentication information, but the processed authentication information may be information obtained by processing the registered authentication information before the determination regarding the possibility of false rejection is performed. In the embodiment, the processed authentication information is created on the spot at the time of authentication, but in this modification example, the processed authentication information can be created in advance, and the processed authentication information created in advance may be stored in the user database DB.

For example, in the case of registering registered authentication information, the server 10 creates processed authentication information and stores the created processed authentication information in the user database DB. The processing method itself is as described in the embodiment. In the processing of creating the processed authentication information from the input authentication information described in the embodiment, the term "input authentication information" may be read as "registered authentication information." The processed authentication information is stored in the user database DB in association with the registered authentication information from which the processed authentication information is created.

The processed authentication information may be stored in a database other than the user database DB. Further, the timing of creating the processed authentication information is not limited to the time when the registered authentication information is registered. For example, the processed authentication information may be created by batch processing at night, or the processed authentication information may be created when a certain period of time has elapsed after the registered authentication information is registered. The processed authentication information may be created at any timing until the determination of the possibility of false rejection is performed.

When it is determined that there is the possibility of false rejection, the acquisition module 103 acquires processed authentication information that has been processed in advance. For example, the acquisition module 103 refers to the user database DB, and acquires the processed authentication information associated with the registered authentication information (for example, the registered authentication information similar to the input authentication information) for which there is the possibility of false rejection. The authentication method by the second authentication module 104 is as described in the embodiment.

According to Modification Example (1) of the present invention, the processed authentication information can be created in advance by processing the registered authentication information in advance before the determination of the possibility of false rejection is performed. As a result, the authentication can be speeded up compared to the case of creating the processed authentication information on the spot.

(2) Further, for example, in the embodiment, a situation in which the user passes through the security gate SG is described as an example, but the authentication system S is also applicable to a situation in which the user purchases a product or uses a service. In this case, for example, the authentication device 30 is a vending machine, a ticket machine, a POS terminal, or a payment terminal in a store. The user faces the photographing unit 36 of the authentication device 30 and inputs the passcode from the operation unit 34. When face authentication and passcode authentication are successful, payment processing is executed, and the product can be purchased or the service can be used.

When authentication is successful, the processing execution module 105 may execute payment processing based on the payment information on a user for which authentication is successful. The payment information to be referred to at the time of payment processing is payment information associated with the user for which face authentication and passcode authentication are successful.

The payment information is information required in order to perform payment, such as credit card information, electronic value (e.g., electronic money or points) account information, virtual currency account information, bank account information, or debit card information. It is assumed that the payment information is registered during user registration, and is stored in the user database DB in association with the user ID, for example. The payment information may be stored in a database different from the user database DB.

It is sufficient for the processing execution module 105 to execute payment processing corresponding to the payment information. For example, the processing execution module 105 executes credit processing based on credit card information, processing of decreasing an electronic value balance, processing of decreasing a virtual currency balance, processing of debiting and transferring from a bank account, or processing of decreasing the balance of the account indicated by debit card information. The processing execution module 105 does not execute payment processing when any one of face authentication and passcode authentication fails, and executes payment processing when face authentication and passcode authentication are successful.

When payment processing has been executed, that fact is displayed on the display unit 35 of the authentication device 30 or a terminal of the shop, and the user receives the product or uses the service. For example, in a case where the authentication device 30 is a digital signage device installed in a shop or the like, when an authentication successful notification is received from the server 10, a message indicating that the authentication has been successful is displayed on the display unit 35. When a shop staff member confirms the message, the staff member hands over the product or provides the service to the user. In place of the authentication device 30, the message may be transferred to another computer, such as a terminal operated by the shop staff member, to be displayed. As another example, in a case where the authentication device 30 is a vending machine, when an authentication successful notification is received from the server 10, the authentication device 30 discharges the product specified by the user or prepares a product such as coffee or instant food.

According to Modification Example (2), security at the time of purchasing a product or using a service can be sufficiently enhanced by preventing another user having a similar face from improperly purchasing a product or using a service by impersonating the user and paying. Further, from the viewpoint of the user, usability can be improved because it is possible to perform payment in a secure manner even when the user goes to the shop without carrying any money or the like, and from the viewpoint of the shop, shop's convenience can be improved because payment is possible without requiring a dedicated device, for example, a credit card reader, to be installed.

(3) Further, for example, the above-mentioned modification examples may be combined.

For example, there has been described a case in which biometric authentication is executed based on an image photographed by the photographing unit 36 of the authentication device 30. However, the biometric authentication may also be executed by using another sensor, such as an infrared sensor or an ultrasonic sensor. The authentication system S is only required to include a sensor corresponding to the biometric authentication to be used.

For example, there has been described a case in which the authentication information is input to the authentication device 30, but the authentication information may be input to the user terminal 20 or another computer. Further, for example, there has been described a case in which biometric authentication is the first authentication, but the first authentication may be any authentication based on similarity, and is not limited to biometric authentication. For example, pattern authentication in which the user draws a predetermined locus on a touch panel may be used as the first authentication. As another example, the first authentication may be authentication based on similarity between countersigns. In this case, when the countersign input by the user is similar to the countersign registered in the user database DB (proportion of matching part is equal to or more than threshold value), authentication is successful, and when those countersigns are not similar, authentication fails. As another example, as the first authentication, a plurality of biometric authentications may be used in combination, or pattern authentication and countersign authentication may be used in combination.

Further, for example, only one-step authentication may be executed without executing two-step authentication. In the case of executing only one-step authentication, any one of the authentication based on similarity and the authentication based on matching may be used. Moreover, for example, the input authentication information and the registered authentication information may both be processed. In this case, for example, a determination may be performed regarding whether or not the processed authentication information obtained by processing the input authentication information and the processed authentication information obtained by processing the registered authentication information are closer to each other. In addition, for example, the determination using the marginal threshold values MTb and MTx may be omitted.

For example, there has been described a case in which the main functions are implemented by the server 10, but each function may be shared by a plurality of computers. For example, functions may be shared among the server 10, the user terminal 20, and the authentication device 30. For example, the authentication processing may be executed by the user terminal 20 or the authentication device 30 in place of the server 10. Further, for example, when the authentication system S includes a plurality of server computers, the functions may be shared by those plurality of server computers. In addition, for example, the data described as being stored in the data storage unit 100 may be stored by a computer other than the server 10.

The invention claimed is:
1. An authentication system, comprising at least one processor configured to:
    perform, based on a similarity between input authentication information that has been input and registered authentication information that has been registered, authentication of a user to be authenticated;

determine whether there is a possibility that the user is authenticated as another user by comparing an image of the face of the user and an image of a face of the another user;

acquire, after it is determined that there is the possibility that the user is authenticated as another user, for the input authentication information, a plurality of pieces of processed authentication information processed differently from each other; and determine, after it is determined that there is the possibility that the user is authenticated as another user, whether a predetermined number or more of pieces of processed authentication information are more similar to the registered authentication information than to the input authentication information and perform the authentication based on a result of the determination.

2. The authentication system according to claim 1, wherein the predetermined number is a total number of the plurality of pieces of processed authentication information, and wherein the at least one processor is configured to determine whether all of the plurality of pieces of processed authentication information are more similar to the registered authentication information than to the input authentication information, and to perform the authentication based on a result of the determination.

3. The authentication system according to claim 1, wherein the at least one processor is configured to perform the authentication based on a similarity between the input authentication information and the registered authentication information, and wherein the at least one processor is configured to determine that there is the possibility that the user is authenticated as another user when a plurality of pieces of registered authentication information are similar to the input authentication information.

4. The authentication system according to claim 3, wherein the at least one processor is configured to acquire a similarity degree between the input authentication information and each of the plurality of pieces of registered authentication information, and to determine whether there is the possibility that the user is authenticated as another user based on a difference between the acquired similarity degrees.

5. The authentication system according to claim 1, wherein the at least one processor is configured to perform the authentication based on a similarity between the input authentication information and the registered authentication information, and wherein the at least one processor is configured to acquire a similarity degree of the registered authentication information determined to be similar to the input authentication information and a similarity degree of the registered authentication information determined not to be similar to the input authentication information, and to determine whether there is the possibility that the user is authenticated as another user based on a difference between the acquired similarity degrees.

6. The authentication system according to claim 1, wherein the at least one processor is configured to perform, as the authentication, a first authentication to be performed based on a similarity between first input authentication information and first registered authentication information, and a second authentication to be performed based on a match between second input authentication information and second registered authentication information, and wherein the at least one processor is configured to determine, in both the first authentication and the second authentication, whether there is the possibility that the user is authenticated as another user.

7. The authentication system according to claim 1, wherein the at least one processor is configured to acquire a similarity degree between the input authentication information and the registered authentication information based on a learning model, and to perform the authentication based on the similarity degree, and wherein the at least one processor is configured to acquire a similarity degree corresponding to the processed authentication information based on the learning model, and to perform the authentication based on the similarity degree.

8. The authentication system according to claim 1, wherein the input authentication information is an input image that has been input or an input feature amount corresponding to the input image, wherein the registered authentication information is a registered image that has been registered or a registered feature amount corresponding to the registered image, and wherein the processed authentication information is a processed image obtained by processing at least one of the input image or the registered image, or a processed feature amount corresponding to the processed image.

9. The authentication system according to claim 1, wherein the authentication is biometric authentication, wherein the input authentication information is biometric authentication information that has been input, wherein the registered authentication information is biometric authentication information that has been registered, and wherein the processed authentication information is biometric authentication information that has been processed.

10. The authentication system according to claim 1, wherein the at least one processor is configured to acquire, when there is the possibility that the user is authenticated as another user, the processed authentication information by processing the input authentication information.

11. The authentication system according to claim 1, wherein the processed authentication information is information obtained by processing the registered authentication information before it is determined whether there is the possibility that the user is authenticated as another user, and wherein the at least one processor is configured to acquire, when it is determined that there is the possibility that the user is authenticated as another user, the processed authentication information processed in advance.

12. The authentication system according to claim 1, wherein the at least one processor is configured to execute, when the authentication is successful, payment processing based on payment information on a user for which the authentication is successful.

13. The authentication system according to claim 1, wherein the plurality of pieces of processed authentication information, that are processed differently from each other, are all based on a single authentication image.

14. The authentication system according to claim 13, wherein the different processing based on the single authentication image includes varying at least one element of the single authentication image selected from the group consisting of: color, brightness, orientation, size or resolution.

15. The authentication system according to claim 1, wherein the processor is further configured determine whether there is a possibility that the user is authenticated as another user by calculating a distance between a feature amount of a face of the user and a feature amount of a face of all users which have similar registered authentication information to the user.

16. An authentication method, comprising:
   performing, based on a similarity between input authentication information that has been input and registered authentication information that has been registered, authentication of a user to be authenticated;
   determining whether there is a possibility that the user is authenticated as another user by comparing an image of the face of the user and an image of a face of the another user;
   acquiring, after it is determined that there is the possibility that the user is authenticated as another user for the input authentication information, a plurality of pieces of processed authentication information processed differently from each other; and
   determine, after it is determined that there is the possibility that the user is authenticated as another user, whether a predetermined number or more of pieces of processed authentication information are more similar to the registered authentication information than to the input authentication information and perform the authentication based on a result of the determination.

17. A non-transitory computer-readable information storage medium for storing a program for causing a computer to:
   perform, based on a similarity between input authentication information that has been input and registered authentication information that has been registered, authentication of a user to be authenticated;
   determine whether there is a possibility that the user is authenticated as another user by comparing an image of the face of the user and an image of a face of the another user;
   acquire, after it is determined that there is the possibility that the user is authenticated as another user, for the input authentication information, a plurality of pieces of processed authentication information processed differently from each other; and
   determine, after it is determined that there is the possibility that the user is authenticated as another user, whether a predetermined number or more of pieces of processed authentication information are more similar to the registered authentication information than to the input authentication information and perform the authentication based on a result of the determination.

* * * * *